United States Patent [19]
Krisher

[11] Patent Number: 5,633,892
[45] Date of Patent: May 27, 1997

[54] HYBRID LINE CODING METHOD AND APPARATUS USING 4B/3T ENCODING FOR PAYLOAD BITS AND 1B/1T ENCODING FOR FRAMING INFORMATION

[75] Inventor: Dale L. Krisher, Wake Forest, N.C.

[73] Assignee: Alcatel Network Systems, Inc., Richardson, Tex.

[21] Appl. No.: 279,197

[22] Filed: Jul. 22, 1994

[51] Int. Cl.$^6$ ................................................. H04L 25/49
[52] U.S. Cl. ........................... 375/286; 375/293; 341/57; 370/509
[58] Field of Search ....................... 375/295, 286, 375/242, 246, 253, 254, 296, 288, 293; 341/57, 56; 370/105.1

[56] References Cited

U.S. PATENT DOCUMENTS

| | | | |
|---|---|---|---|
| 3,689,699 | 9/1972 | Brenig et al. | 179/15 |
| 4,972,408 | 11/1990 | Le Bihan Hervé et al. | 375/286 |
| 5,124,979 | 6/1992 | Matui | 375/286 |
| 5,325,355 | 6/1994 | Oprescu et al. | 370/24 |
| 5,408,499 | 4/1995 | Sasaki | 375/286 |

FOREIGN PATENT DOCUMENTS

| | | |
|---|---|---|
| 630773 | 6/1991 | Australia. |
| 0432556 | 6/1991 | European Pat. Off.. |
| 0565890 | 10/1993 | European Pat. Off.. |

OTHER PUBLICATIONS

Trenovskaya et al, Computer Model of Digital Transmission System Line Channels, Telecommunication Radio Engin. pp. 22–26. Dec. 1990.

"Sequence–State Coding for Digital Transmission", P. Franaszek, *Bell System Technical Journal*, Nov. 1967, pp. 143–157.

"48 PCM Channels on T1 Facilities", E. Schnegelberger et al, *Proceedings of the National Electronics Conference*, 1975, vol. 30, pp. 201–205.

"Ternary Line Codes", J. Buchner, *Philips Telecommunication Review*, vol. 34, No. 2, Jun. 1976, pp. 72–86.

*Primary Examiner*—Wellington Chin
*Assistant Examiner*—William Luther
*Attorney, Agent, or Firm*—Ware, Fressola, Van Der Sluys & Adolphson LLP

[57] ABSTRACT

Existing infrastructures such as DS1 or E1 are used at currently accepted rates to carry a third more information by using a hybrid encoding technique wherein a 4B3T encoding is done for the payload bits, while a 1B1T encoding technique is used for framing information. In this way, for example, a DS1 can be used at 1.54 Mbit per second to carry 2.058 Mbits of binary payload, while respecting the 8 kilobits of framing expected by DS1 hardware. Similarly, for example, an E1 infrastructure can be used at the accepted 2.048 Mbit per second rate to carry 2.560 Mbits of binary payload plus 128 kilobits of binary framing/CRC without having to change the accepted E1 framing techniques.

19 Claims, 18 Drawing Sheets

| Table Entry | Ternary Information | | Binary Information | |
|---|---|---|---|---|
| | Symbol 1 | Ternary Disparity | Bit 1 | Binary Value |
| 1 | 0 | 0 | 0 | 0 |
| 2 | + | +1 | 1 | 1 |
| 3 | - | -1 | 1 | 1 |

Ternary Code | Binary Code

| Table Entry | Ternary Information ||||  Binary Information |||||
|---|---|---|---|---|---|---|---|---|---|
| | Sym. 1 | Sym. 2 | Sym. 3 | Ternary Disparity | Bit 1 | Bit 2 | Bit 3 | Bit 4 | Nibble Value |
| 1 | + | − | 0 | 0 | 1 | 1 | 0 | 0 | 12 |
| 2 | 0 | − | + | 0 | 0 | 1 | 0 | 0 | 4 |
| 3 | − | 0 | + | 0 | 0 | 0 | 1 | 0 | 2 |
| 4 | − | + | 0 | 0 | 1 | 0 | 0 | 1 | 9 |
| 5 | 0 | + | − | 0 | 1 | 0 | 1 | 0 | 10 |
| 6 | + | 0 | − | 0 | 1 | 0 | 0 | 0 | 8 |
| 7 | + | 0 | 0 | +1 | 1 | 1 | 0 | 1 | 13 |
| 8 | 0 | − | 0 | −1 | 1 | 1 | 0 | 1 | 13 |
| 9 | + | − | + | +1 | 0 | 1 | 1 | 0 | 6 |
| 10 | − | − | + | −1 | 0 | 1 | 1 | 0 | 6 |
| 11 | 0 | 0 | + | +1 | 0 | 0 | 0 | 1 | 1 |
| 12 | − | 0 | 0 | −1 | 0 | 0 | 0 | 1 | 1 |
| 13 | − | + | + | +1 | 0 | 0 | 0 | 0 | 0 |
| 14 | − | + | − | −1 | 0 | 0 | 0 | 0 | 0 |
| 15 | 0 | + | 0 | +1 | 1 | 0 | 1 | 1 | 11 |
| 16 | 0 | 0 | − | −1 | 1 | 0 | 1 | 1 | 11 |
| 17 | + | + | − | +1 | 1 | 1 | 1 | 0 | 14 |
| 18 | + | − | − | −1 | 1 | 1 | 1 | 0 | 14 |
| 19 | 0 | + | + | +2 | 0 | 0 | 1 | 1 | 3 |
| 20 | − | 0 | − | −2 | 0 | 0 | 1 | 1 | 3 |
| 21 | + | + | 0 | +2 | 1 | 1 | 1 | 1 | 15 |
| 22 | 0 | − | − | −2 | 1 | 1 | 1 | 1 | 15 |
| 23 | + | 0 | + | +2 | 0 | 1 | 0 | 1 | 5 |
| 24 | − | − | 0 | −2 | 0 | 1 | 0 | 1 | 5 |
| 25 | + | + | + | +3 | 0 | 1 | 1 | 1 | 7 |
| 26 | − | − | − | −3 | 0 | 1 | 1 | 1 | 7 |
| 27 | 0 | 0 | 0 | Unused | N/A | N/A | N/A | N/A | Unused |

Ternary Code — Binary Code

FIGURE 8

(PRIOR ART)

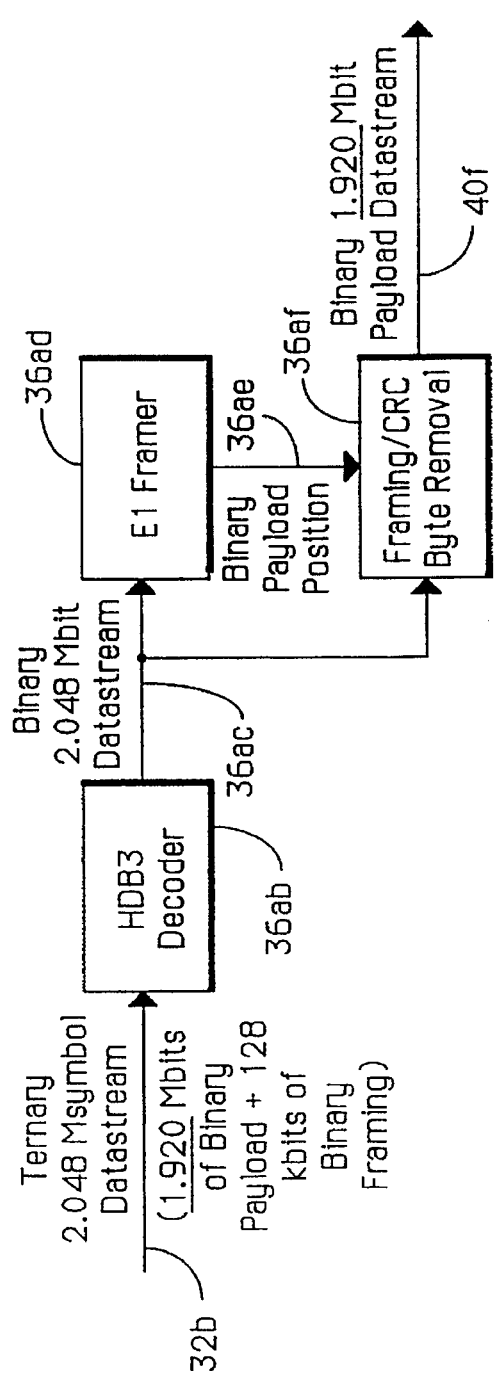
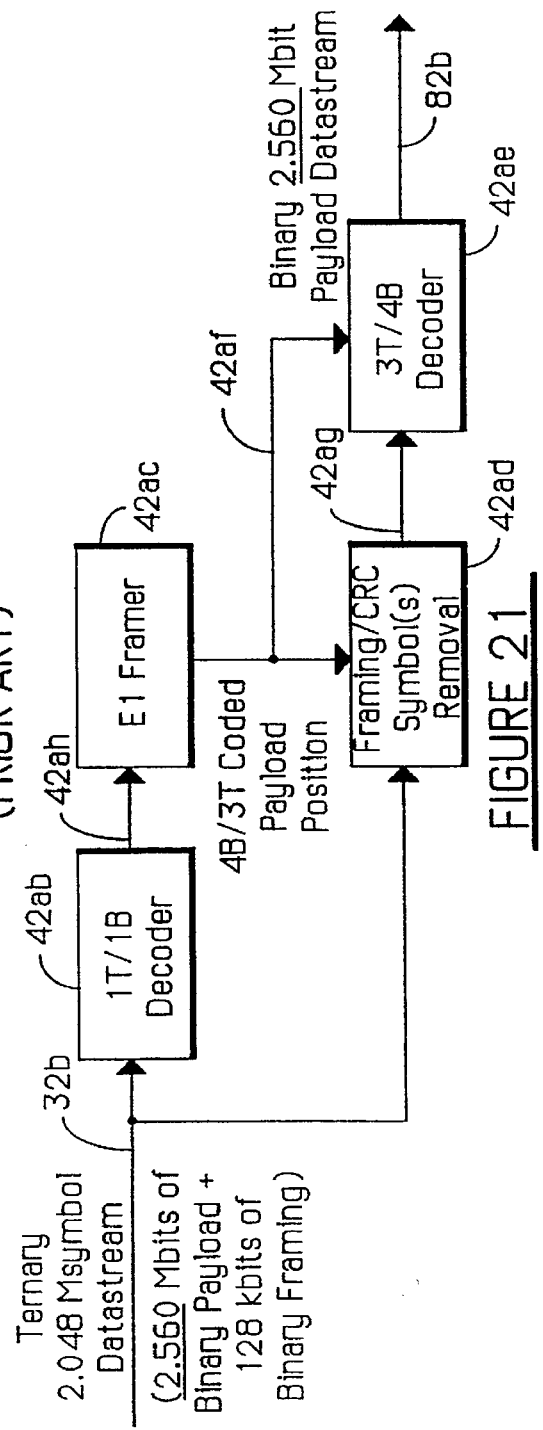

HYBRID LINE CODING METHOD AND APPARATUS USING 4B/3T ENCODING FOR PAYLOAD BITS AND 1B/1T ENCODING FOR FRAMING INFORMATION

TECHNICAL FIELD

This invention relates to telecommunications and, more particularly, to increasing bandwidth using existing electrical infrastructure without increasing symbol rate.

BACKGROUND OF THE INVENTION

There is an enormous base of existing DS1 facilities in the world's telecommunications infrastructure, particularly in North America. Similarly, there is a very large base of existing E1 facilities in the world's telecommunications infrastructure, particularly in Europe. These facilities consist of millions of miles of copper wire pairs, thousands of communications office wire frames, millions of DS1 and E1 connectors; each constructed specifically to carry one or more signals with the characteristics of the traditional electrical DS1 or E1 link.

Each of these separate infrastructures is designed to transport DS1 or E1 signals based on the known and understood electrical characteristics of the traditional, ternary, Alternate Mark Inverted (AMI) line coded 1.544 Megasymbols/sec DS1 format or the 2.048 Megasymbols/sec HDB3 format. The implemented binary and ternary data capacity of the AMI line coded DS1 electrical format is 1.536 Msymbols of payload bits plus 8 Ksymbols of DS1 framing bits. The implemented binary and ternary data capacity of the HDB3 line coded E1 electrical format is 1.920 Megasymbolss of payload bits plus 64 Ksymbols of E1 framing bits and 64 Ksymbols of CRC/Signaling.

Although an alternative, it is only marginally possible to increase the binary capacity of the existing DS1 or E1 infrastructures by simply increasing the symbol rate of the ternary encoded electrical signals above the existing symbol rates. The planning rules for the whole of the DS1 and E1 infrastructures are respectively based on the electrical characteristics of the ternary 1.544 Megasymbol/s DS1 and 2.048 Megasymbol/s E1 electrical signals, and the introduction of higher line rates would result in unacceptable changes in parameters such electrical crosstalk between wire pairs in inter-office and intra-office cable bundles or connection panels. The unacceptable changes in these parameters prevent increases in binary payload capacity within those infrastructures from being expanded by simply increasing the line symbol rate.

In the current art, the AMI line coding format for each electrical DS1 link codes 1.544 Megasymbols of DS1 binary coded data into 1.544 Megasymbols of ternary coded data. Similarly, the HDB3 line coding format for each electrical E1 link codes 2.048 Mbits of E1 binary coded data into 2.048 Msymbols of ternary coded data. The existing AMI and HDB3 line coding techniques assign binary payload values to only 2 of the potential 3 electrical ternary states. The 0 ternary symbol is equated to the 0 binary bit, but more relevantly, both the + and − ternary codes are assigned to the binary 1 symbol. There are minor exceptions to this simple assignment between binary and ternary symbol . Specifically, an exception is when ternary 0 symbol are changed to ternary + or − codes as a part of the HDB3 algorithm to limit the number of consecutive zeros appearing on the E1 line. These exceptions serve only to limit the number of consecutive ternary zeroes and do not increase the binary payload capacity of the E1 line. This assignment of one binary state to two ternary symbol has some benefits in the current art, in that by alternating the polarity of the + or − ternary symbols corresponding to successive "mark" bits (each binary 1 bit is referred to as a "mark"), the low frequency content of the electrical spectrum can be minimized, specifically reducing the DC energy on the line due to the transmitted datastream to a zero content. However, this AMI coding technique suffers from the inefficiency of basically throwing away one third of its potential capacity to transport binary data.

There exist in prior art other ternary line coding techniques which can satisfy the need for controlling the content of low frequency electrical energy while maintaining an efficient binary transport capacity. See P. A. Franaszek, "Sequence-State Coding for Digital Transmission", *Bell System Technical Journal*, December 1968, pp. 143–157. A relevant example of this is the 4B/3T (4 binary symbols/3 ternary bits) line coding technique discussed in more detail below. As mentioned above, for AMI coding, 4 ternary symbols are required to represent each 4 binary bits in a datastream. The 4B/3T coding technique requires only 3 ternary symbols to represent each 4 bits of binary data. Therefore the 4B/3T line coding technique can transport 33 percent more binary data per ternary symbol than AMI or HDB3. But no such prior art coding technique can be used to achieve a desired maximum increase in binary payload capacity while simultaneously maintaining the correct bandwidth for existing framing techniques for DS1 and E1 infrastructures.

The T148 product line of the then ITT Telecommunications, Inc. used 4B/3T coding over the whole of a 2.370 Mbit T148 electrical transmission link to realize a 3.088 Mbit binary payload rate over a 2.370 Megasymbol ternary rate transmission link (2.364 ternary Msymbols for 3.152 binary Mbits for T148C). See E. E. Schnegelberger and P. T. Griffiths, "48 PCM Channels on T1 Facilities", *National Electronics Conference*, 1975, pp. 201–205. Other line coding techniques, such as duo-binary and 4B2Q are used in various transmission lines. However, all of these examples suffer from the same shortcoming, the electrical characteristics at each point in the DS1 or E1 infrastructure, primarily the amplitude and power spectrum of crosstalk experienced between co-located copper pairs in multi-pair cable, prevent the application of these other line coding techniques to the bulk of the existing DS1 and E1 infrastructures. Therefore, these other potential line coding techniques are unable to be made use of in the existing base of DS1 and E1 infrastructures.

DISCLOSURE OF THE INVENTION

An object of the present invention is to provide a way to increase the binary payload capacity of DS1 and E1 signals while maintaining compatibility with existing infrastructures.

According to the present invention, a hybrid ternary line coding process combines two ternary line coding techniques, one for payload and one for framing to achieve an increase in DS1 or E1 binary payload capacity while at the same time maintaining the correct bandwidth for existing DS1 or E1 framing techniques, respectively, and providing the correct overall ternary line disparity with respect to the framing and nonframing code.

The present invention provides a hybrid DS1 line coding technique to replace the traditional DS1 line coding techniques (AMI, B8ZS, etc.). The most significant benefit offered by this new coding technique is that it increases the binary payload capacity of the 1.536 Mbit payload bandwidth of a DS1 line to 2.048 Mbits. The support of 2.048 Mbit of binary payload bandwidth allows the transport of the 2.048 Mbit services, such as, but not limited to, the ITU E1 format that requires binary payload capacity of 2.048 Mbits. Another benefit of this hybrid line coding technique is the support of the existing DS1 framing bandwidth and the framing and other capabilities contained within this framing bandwidth. This allows DS1 lines operating with this new hybrid line coding technique to continue support of all present (SF, ESF, TR8, etc.) 8 kbit framing formats and capabilities as well as any future 8 kbit DS1 framing formats.

Similarly, the present invention provides a hybrid E1 line coding technique to replace the traditional HDB3 E1 line coding. This new coding technique increases the binary payload capacity of the 1.920 Msymbol payload bandwidth of an E1 line to 2.560 Mbits. The support of 2.560 Mbits of binary payload bandwidth allows the transport of the newly defined SONET/SDH VT-2/VC-12 transmission format within the existing E1 physical infrastructure. This payload requires a payload transmission path with a binary payload capacity of 2.560 Mbits. Another benefit of this hybrid line coding technique is the support of the existing E1 framing and CRC/signaling bandwidth and the framing and other capabilities contained within the framing bandwidth. This allows E1 lines operating with this new hybrid line coding technique to continue support of all present 64 kbit E1 framing formats and 64 kbit CRC/signaling byte functions as well as any future 64 kbit E1 framing formats and 64 kbit CRC/signaling byte functions.

The line coding technique, according further to the present invention, does not require an increase in the ternary line symbol rate of the DS1 or E1 signal to increase the binary payload capacity of the DS1 or E1 infrastructure, i.e., the existing line rate remains at the traditional 1.544 or 2.048 Msymbols per second, respectively. Unique to this invention is a hybrid line coding technique in which replaces the existing inefficient ternary Alternate Mark Inverted (AMI) or HDB3 line coding technique commonly used with DS1 or E1, respectively, with an efficient, hybrid, ternary line coding technique which takes advantage of the ternary nature of the DS1 or E1 electrical line coding to provide increases in binary payload capacity of a DS1 or E1 by up to one-third.

The present invention provides a unique hybrid ternary line coding technique which combines two ternary line coding formats, the prior art 4B/3T applied to payload to achieve a 33% increase in binary payload capacity in the DS1 infrastructure and a novel combination therewith of a 1B/1T coding (1 Binary bit to 1 Ternary symbol) format applied to framing bandwidth which for a DS1 context is used to simultaneously maintain the correct bandwidth for the DS1 framing bit and the correct overall ternary line disparity value with relation to the 4B/3T line code (applied to the bits other than the framing bit). Similarly, for the E1 context, the 1B/1T coding applied to the correct bandwidth for the E1 framing and CRC/signaling bytes is provided while providing the correct overall ternary line disparity value with relation to the 4B/3T line code which is applied to the bits other than the framing and CRC/signaling bytes.

The 1.544 Mbits of ternary DS1 data consist of 8000 identical frames per second of 193 ternary symbols each. The DS1 ternary frame consists of 192 symbols of payload and 1 bit of framing information. For the purposes of the present invention, a "tribble" is defined as specifically the 3 ternary symbols which are substituted for a given 4 binary bits which are already known in the art as a binary "nibble". The present invention describes the unique application of the prior art 4B/3T line coding, which codes 256 binary payload bits into 192 ternary DS1 line symbols of the 193 total ternary symbols which make up the DS1 frame. This line coding increases the binary capacity of payload part (non framing bit part) of a DS1 electrical link from 1.536 Mbits to 2.048 Mbits. This invention also describes a unique 1B/1T coding for the 193rd binary framing bit which provides the correct bandwidth necessary for existing DS1 framing bit definitions to be maintained, while introducing the unique ternary line coding rules for the framing bit which allow the ternary framing symbols to exhibit the correct disparity characteristics with respect to the other 192 4B/3T coded ternary payload symbols.

Similarly, the prior art 2.048 Mbits of ternary E1 data consist of 8000 identical frames per second of 256 binary bits. The E1 ternary frame likewise consists of 240 bits of payload and 16 symbols of framing and CRC/signaling information. The first aspect of the present invention also describes the unique application of the prior art 4B/3T line coding to code 320 binary payload bits into 240 ternary E1 line symbols of the 256 total ternary symbols which make up the prior art E1 frame. This line coding increases the binary capacity of payload part (non framing and CRC/signaling byte part) of an E1 electrical link from 1.920 Mbits to 2.560 Mbits. The present invention also describes a unique 1B/1T coding for the two binary framing and CRC/signaling bytes which provides the correct bandwidth necessary for existing E1 framing and CRC/signaling byte definitions to be maintained, while introducing the unique ternary line coding rules for the framing and CRC/signaling bytes which allow these ternary symbols to exhibit the correct disparity characteristics with respect to the other 240 4B/3T coded ternary payload symbols.

Another characteristic unique to the present invention is the relationship between the location of the binary nibbles and ternary tribbles which make up the payload datastream and between the locations of these payload datastream nibbles and tribbles and the location of the DS1 framing bits and symbols or the E1 framing and CRC/signaling bytes and symbols. This relationship is such that when the position of the DS1 framing bit and symbol or E1 framing or CRC/signaling bytes and symbols are known, e.g., by traditional framing and frame detection techniques, the locations of the binary nibbles and ternary tribbles are also known. In the prior art of T148, for example, the locations of the boundaries of the ternary tribbles were indiscriminate with respect to any boundary in the binary and ternary datastream. In such prior art systems, ternary words tribbles were identified by observing the overall disparity of the ternary datastream and moving through the three potential tribble boundary locations of the ternary datastream until a ternary word boundary was observed which met the appropriate disparity qualifications. This is known as statistical framing. For the case of DS1 coded according to the present invention, on the other hand, the unique hybrid coding characteristics of the present invention provide for the easy location of the 32, 8 binary bit byte locations in the 192 ternary symbol payload frame. For the case of E1, these unique characteristics provide for the easy location of the 40, 8 binary bit byte locations in the 240 ternary symbol payload frame using the existing DS1 and E1 framing methods, respectively.

These and other objects, features and advantages of the present invention will become more apparent in light of the following detailed description of a best mode embodiment thereof, as illustrated in the accompanying drawing.

BRIEF DESCRIPTION OF THE DRAWING

FIG. 8 shows a prior art 4B/3T coding table for payload data as used in T148 span lines developed by ITT Telecommunications.

FIG. 9 shows the relation between FIGS. 9a and 9b.

FIG. 15 shows the relation between FIGS. 15a, 15b and 15c.

FIG. 20 shows a prior art HDB3 decoder in conjunction with framing and which might be included in an existing E1 line coding/decoding block 36b of FIG. 5.

FIG. 21 shows a decoder in conjunction with framing, such as might be included in the hybrid E1 line coding/decoding block 42b of FIG. 6, according to the present invention.

BEST MODE FOR CARRYING OUT THE INVENTION

As mentioned, there is an enormous base of existing DS1 and E1 facilities in the world's telecommunications infrastructure. These facilities are designed to transport either DS1 or E1 signals based on the known and understood electrical characteristics of the traditional, ternary, Alternate Mark Inverted (AMI) line coded 1.544 Msymbol DS1 format or the HDB3 line coded 2.048 Msymbol E1 format.

The DS1 rate (1.544 Msymbol/s) has been accepted as the basic building block for the North American digital hierarchy. All DS1 transmission systems and multiplexers in use in North America today are electrically compatible at this rate. The DS1 rate was established by the Bell Labs as the transmission rate for the first commercial pulse code modulation (PCM) cable carrier system in the early 1960s. This rate was chosen as an optimum rate for transmission over existing 6,000 ft. spans of 22-gauge exchange-grade cable. DS1 frames consist of 192 symbol of payload, plus one framing symbol, inserted to supply the necessary synchronizing information for the receiving terminal per frame. Because the frames occur at 8,000 times per second, the terminal symbol rate is 193×8,000=1,544,000 symbols/second.

Figure 1:
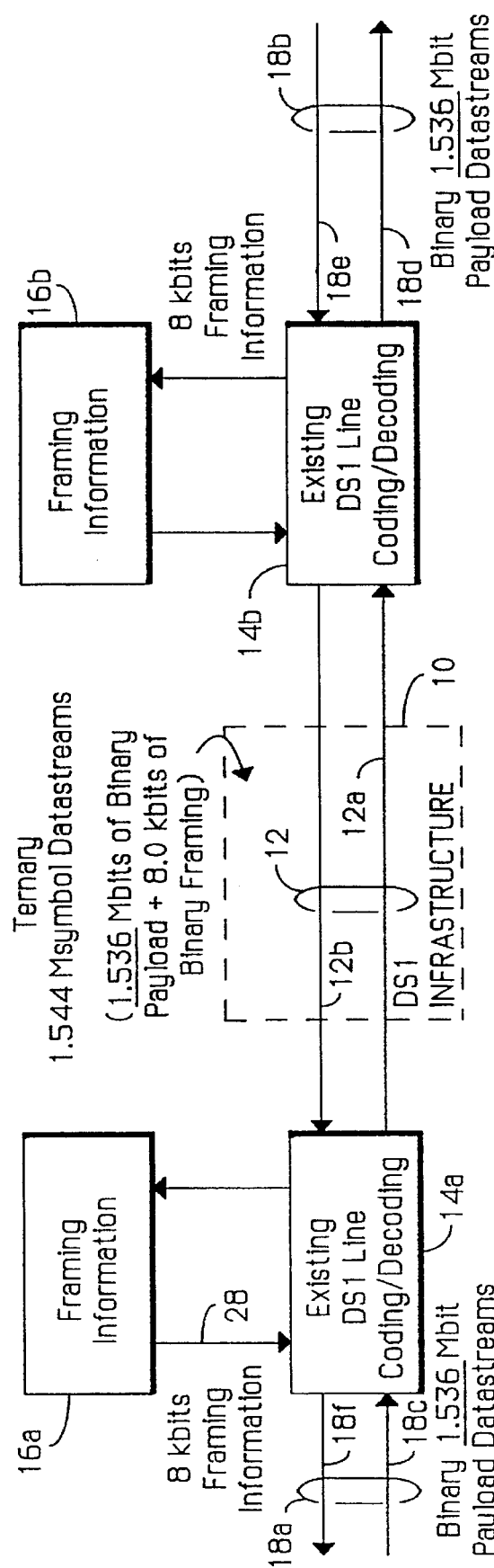
FIG. 1 illustrates a DS1 line such as forms the DS1 infrastructure in North America and other continents.

FIG. 1 shows an example of the existing DS1 infrastructure 10, in this particular case comprising a pair 12 of copper wire pairs 12a, 12b each carrying a corresponding pair of ternary coded 1.544 Msymbol datastreams between existing DS1 line coding/decoding blocks 14a, 14b. The ternary 1.544 Msymbol datastream on a given copper wire pair 12a, 12b comprises 1.536 Mbits of binary payload plus 8.0 Kbits of binary framing. Framing information is exchanged between the existing DS1 line coding/decoding blocks 14a, 14b and existing framing information blocks 16a, 16b, respectively. 1.536 Mbits binary payload datastream pairs 18a, 18b are connected to the existing DS1 line coding/decoding blocks 14a, 14b, respectively.

Figure 2:
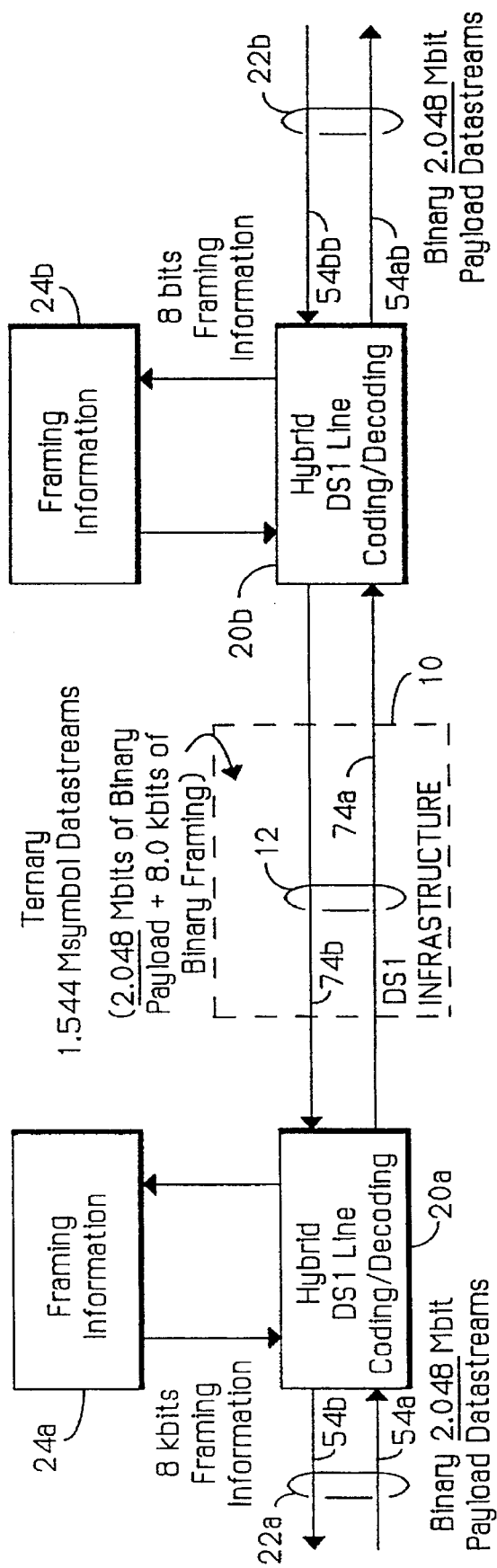
FIG. 2 shows how that same infrastructure can be utilized, according to the present invention, to transport increased binary payload at the same symbol rate.

According to the present invention, as shown in FIG. 2, the existing DS1 infrastructure 10 can have its information content increased to 2.048 Mbits of binary payload plus 8.0 kbits of binary framing in each direction using a ternary 1.544 Msymbol datastream, i.e., at the same symbol rate. This is done by means of a hybrid DS1 line coding/decoding technique that can be carried out by means of coding/decoding blocks 20a, 20b connected to payload pairs 22a, 22b, each carrying two binary 2.048 Mbits payloads, one in each direction. Framing information is exchanged between the hybrid DS1 line coding/decoding blocks 20a, 20b and framing information blocks 24a, 24b for exchanging 8 kilobits of framing information, the direction depending on whether coding or decoding is taking place.

Figure 3:
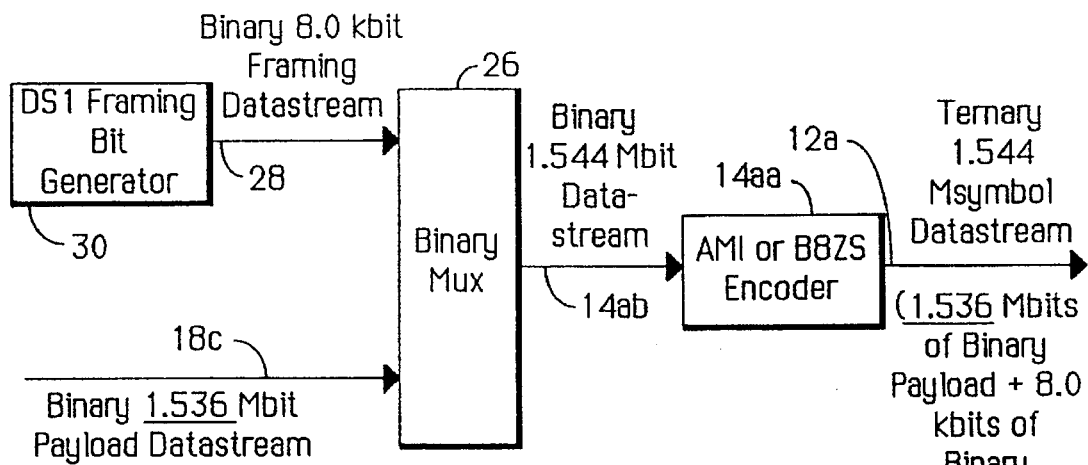
FIG. 3 shows a prior art technique for providing a DS1 datastream.

FIG. 3 shows a prior art technique for providing a DS1 datastream such as on the line 12a of FIG. 1 from an AMI or B8ZS encoder 14aa in response to a 1.544 Mbits binary datastream on a line 14ab. In other words, the DS1 datastream on the line 12a is representative of one of the signals 12 in the pair of signals shown on the DS1 infrastructure 10 in FIG. 1, and the binary 1.536 Mbits payload datastream on the line 18c in FIG. 1 is representative of one signal of the pairs of signals on the lines 18a, 18b in FIG. 1. The DS1 signal on the line 12a is the traditional, ternary, Alternate Mark Inverted (AMI) line coded 1.544 Msymbol DS1 format that comprises a 1.536 Mbits payload plus 8 kbits of DS1 framing bits. This 192 bits of payload and one framing bit repeats every 125 μsec.

Figures 4, 10:
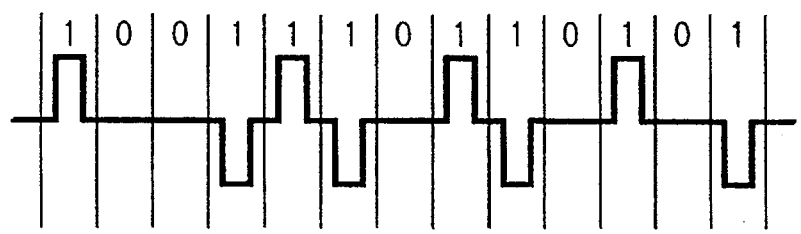
FIG. 4 shows a prior art ternary, Alternate Mark Inverted (AMI) line coded signal such as a DS1 signal provided in FIG. 3.
FIG. 10 shows a 1B/1T coding table, according to the present invention, for use in coding framing and/or CRC/signaling data.

As mentioned above, the intent of the AMI coding is to create an electrical signal appropriate for transmissions over the DS1 electrical infrastructure. Binary data is encoded with three levels but is symmetrically balanced about zero volts. This is called a balanced code or a bipolar code. Most wire-line transmission links do not pass DC signals by virtue of their being AC coupled with transformers or capacitors to isolate DC paths. There are numerous line codes that are specifically designed to not contain DC energy and thereby be unaffected by DC blocking. Bipolar coding uses three levels to encode binary data as shown in FIG. 4. Specifically, a logic zero is encoded with zero voltage while a logic one is usually alternately encoded with positive and negative voltages. Hence the average voltage level is maintained at zero, to effectively eliminate the DC and low frequency components in the signal spectrum.

As shown in FIG. 3, the binary 1.544 Mbits datastream on the line 14ab is provided by a binary multiplexer 26 that is responsive to the binary 1.536 Mbits payload datastream on the line 18c and to a binary 8.0 kbit stream of framing bits on a line 28 from a DS1 framing bit generator 30.

Figure 5:
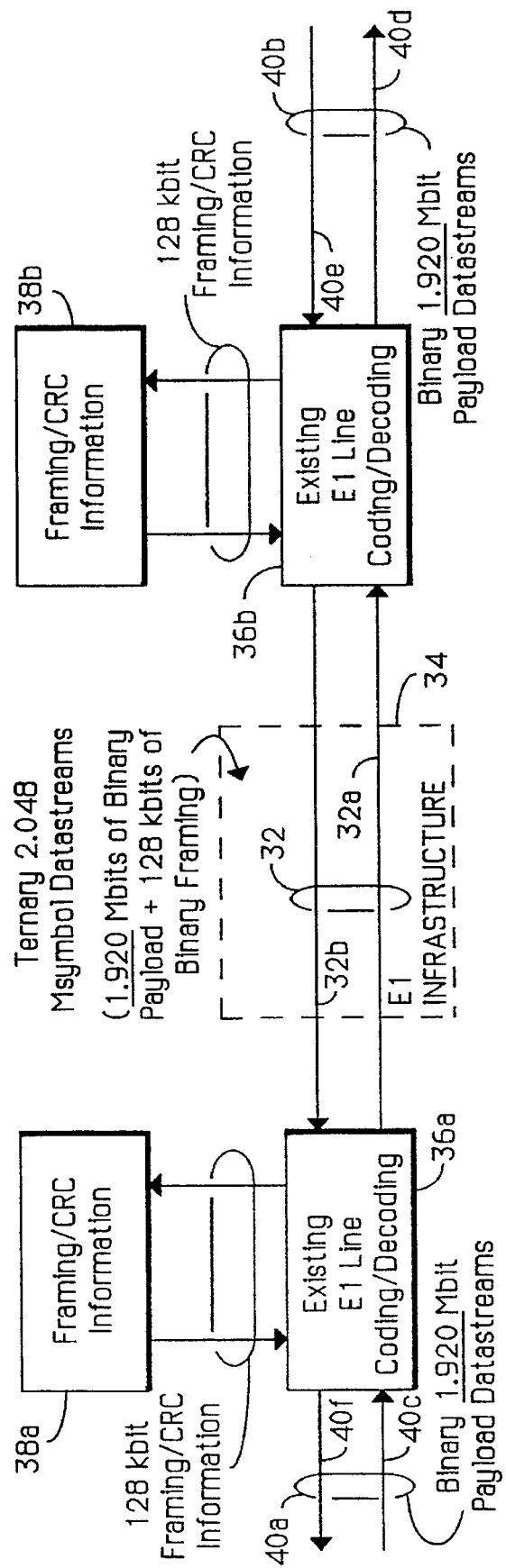
FIG. 5 illustrates an E1 line such as forms the E1 infrastructure in Europe and elsewhere.

FIG. 5 illustrates a prior art bidirectional line 32, such as forms part of the E1 infrastructure 34, made up of many such lines in Europe and elsewhere. As in the case of DS1 lines, such lines need not be paired in bidirectional pairs, but may comprise a single copper wire pair for transmission of information in one direction. In most cases, however, the infrastructure comprises two such copper wire pairs to provide bidirectionality. Each copper wire pair carries a ternary 2.048 Msymbol datastream in one of the two directions. This ternary datastream carries 1.920 Mbits of binary payload plus 128 kbits of binary framing/CRC information. Existing E1 line coding/decoding blocks 36a, 36b are interconnected by the bidirectional pair 32 and are each connected to a corresponding framing/CRC information block 38a, 38b for interchanging 128 kbit framing/CRC information and are also interfaced to corresponding binary 1.920 Mbits payload datastreams 40a, 40b. It will be observed that FIG. 5 is very similar to FIG. 1.

Figure 6:
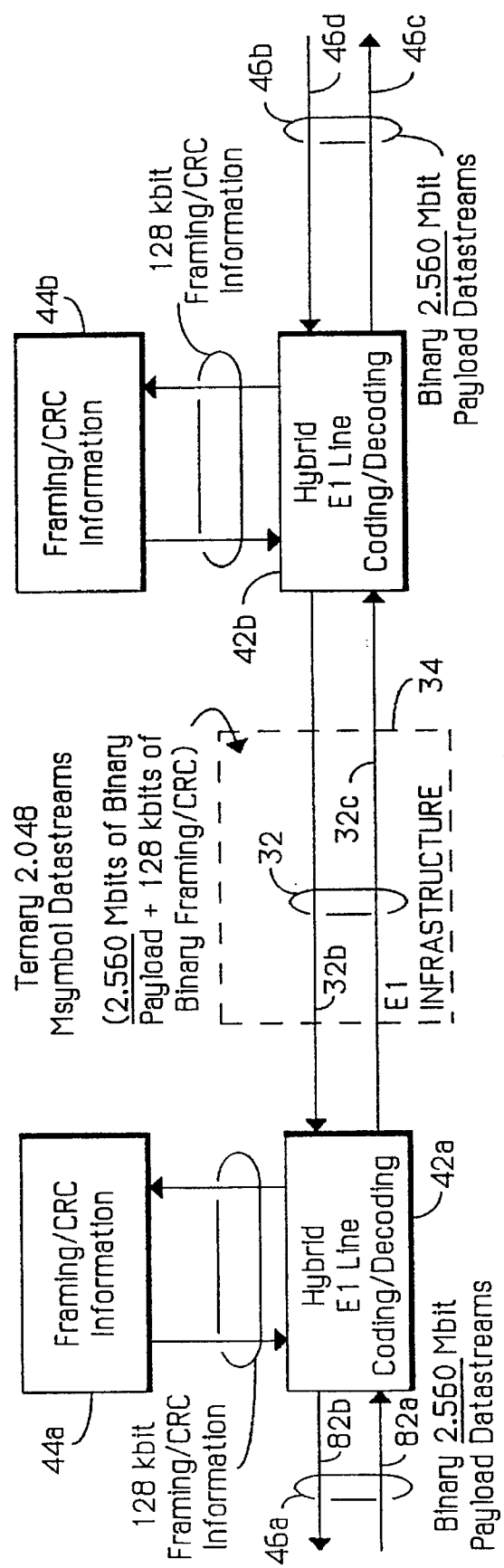
FIG. 6 shows how the E1 infrastructure of FIG. 5 can be used, according to the present invention, to transport increased binary payload at the same rate.

FIG. 6 is similar to FIG. 2 and shows, according to the present invention, how to use the copper wire pair 32 of FIG. 5 to carry more information, while maintaining the same E1 symbol rate and framing/CRC bandwidth. Replacing the existing E1 line coding/decoding blocks 36a, 36b of FIG. 5 are novel hybrid E1 line coding/decoding blocks 42a, 42b, which are similarly used to interconnect the E1 line 32, but which enable them to carry 2.560 Mbits of binary payload plus 128 kbits of binary framing/CRC information in ternary 2.048 Msymbol datastreams in both directions. Each of the hybrid E1 line coding/decoding blocks 42a, 42b interfaces with a corresponding framing/CRC information block 44a, 44b for exchanging the 128 kbit framing/CRC information, and also interface with corresponding binary 2.560 Mbits payload datastreams 46a, 46b.

Figure 7:
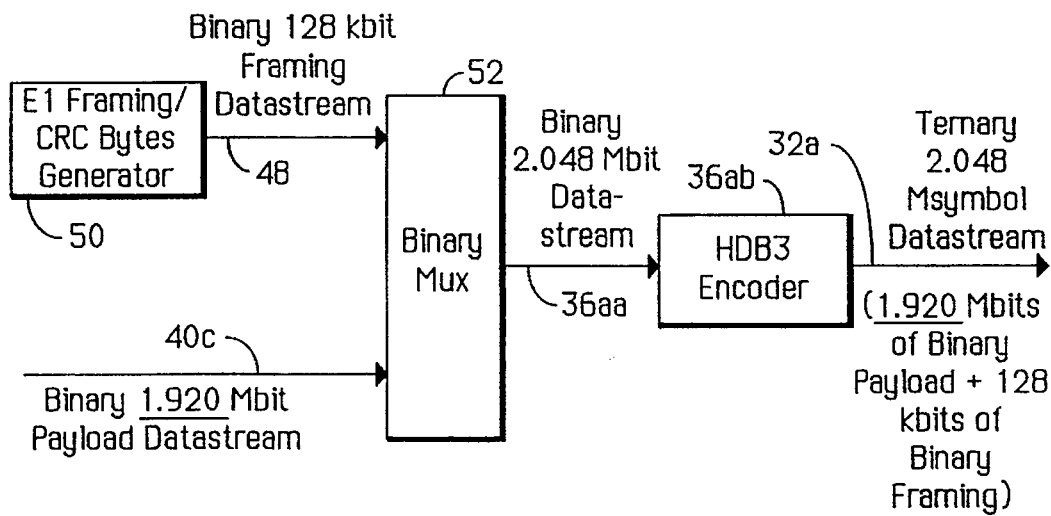
FIG. 7 shows a prior art technique for providing an E1 ternary 2.048 Msymbol datastream.

Similar to the example of FIG. 3, FIG. 7 shows a prior art ternary 2.048 Msymbol datastream on a line 32a being the combination of a binary 1.920 Mbits payload datastream on a line 40c and a binary 128 kbit framing datastream on a line 48 from an E1 framing/CRC bytes generator 50, as multiplexed by a binary multiplexer 52 to provide a binary 2.048 Mbits datastream on a line 36aa to an HDB3 encoder 36ab. The encoder 36ab provides the ternary 2.048 Mbits datastream on the line 32a of FIG. 5.

FIG. 7 is, of course, similar to FIG. 3, except being applicable to the existing E1 infrastructure prevalent in Europe and elsewhere.

As mentioned, since bipolar coding uses two of the symbols for one binary state it is not using its full capabilities to achieve as high an information rate as is possible with more efficient use of the code space. For example, a three symbol ternary code is capable of representing $3^3=27$ different combinations. In contrast, four bits of binary data produce only $2^4=16$ different combinations. The previously described prior art AMI, B8ZS or HDB3 line codes do not take advantage of the higher information content of ternary codes.

As also mentioned above, one known ternary encoding procedure involves mapping successive groups of four binary bits into three ternary (4B/3T) symbols. Since binary words of four bits require only 16 of the 27 possible 3-symbol ternary code tribbles, considerable flexibility exists in selecting the ternary codes. FIG. 8 shows an example of 4B/3T coding as used in the T148 span line developed by ITT Telecommunications and as known in the art. This system provides T-carrier transmission for two DS1 signals (48 channels) using a bandwidth that is approximately 50 percent greater than a T1 bandwidth (carrying 24 channels). The binary-to-ternary encodement procedure of the prior art involves taking a next successive binary payload nibble to be encoded and the current disparity value, and converting the binary payload nibble (4-bits) to a three-bit ternary tribble based on the value of the binary nibble and the current disparity, i.e., choosing a ternary code where a choice exists to most effectively reduce disparity. The selected ternary code is then output and the disparity value updated for the next conversion. The reverse procedure at the receiving end does not involve any selection of codes to control disparity, but merely involves recognizing the frame boundaries by statistical frame detection, identifying the ternary codes and extracting the binary information therefrom.

As also mentioned above, the 1.544 Mbits of binary DS1 data on the line 12a of FIG. 1 are organized in identical frames of 193 binary bits each. The frames repeat at 8 Khz. The DS1 binary frame consists of 192 bits of payload and 1 bit of framing information.

Figure 9A:
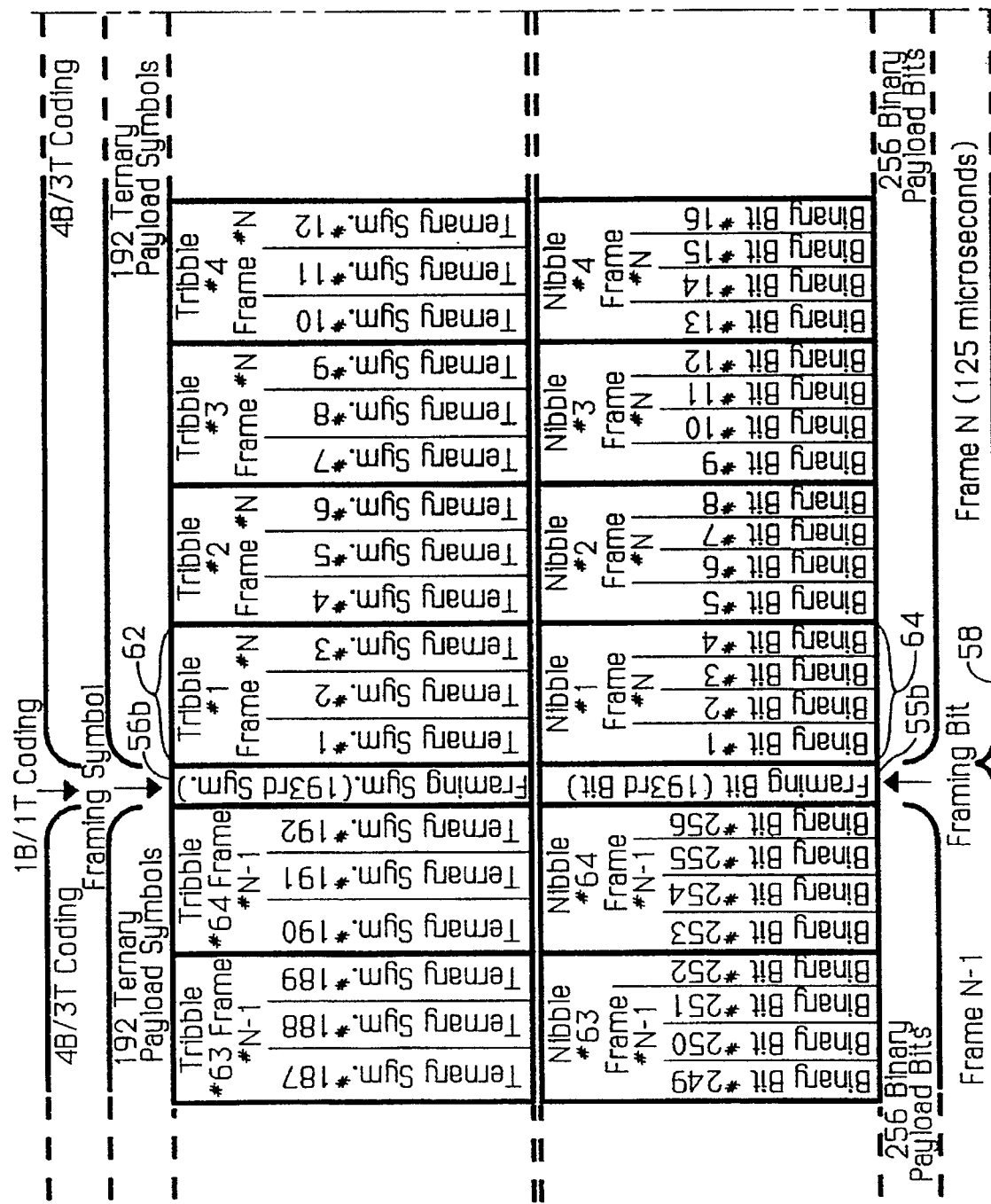
FIGS. 9a and 9b together show a representation of ternary payload symbols with respect to binary payload bits and with respect to framing bits to show the line code position relationship between binary and ternary coded frames, according to the present invention, wherein 2.056 Mbits binary datastreams and 8 kbits framing are mapped into the DS1 line datastream.
Figure 9B:
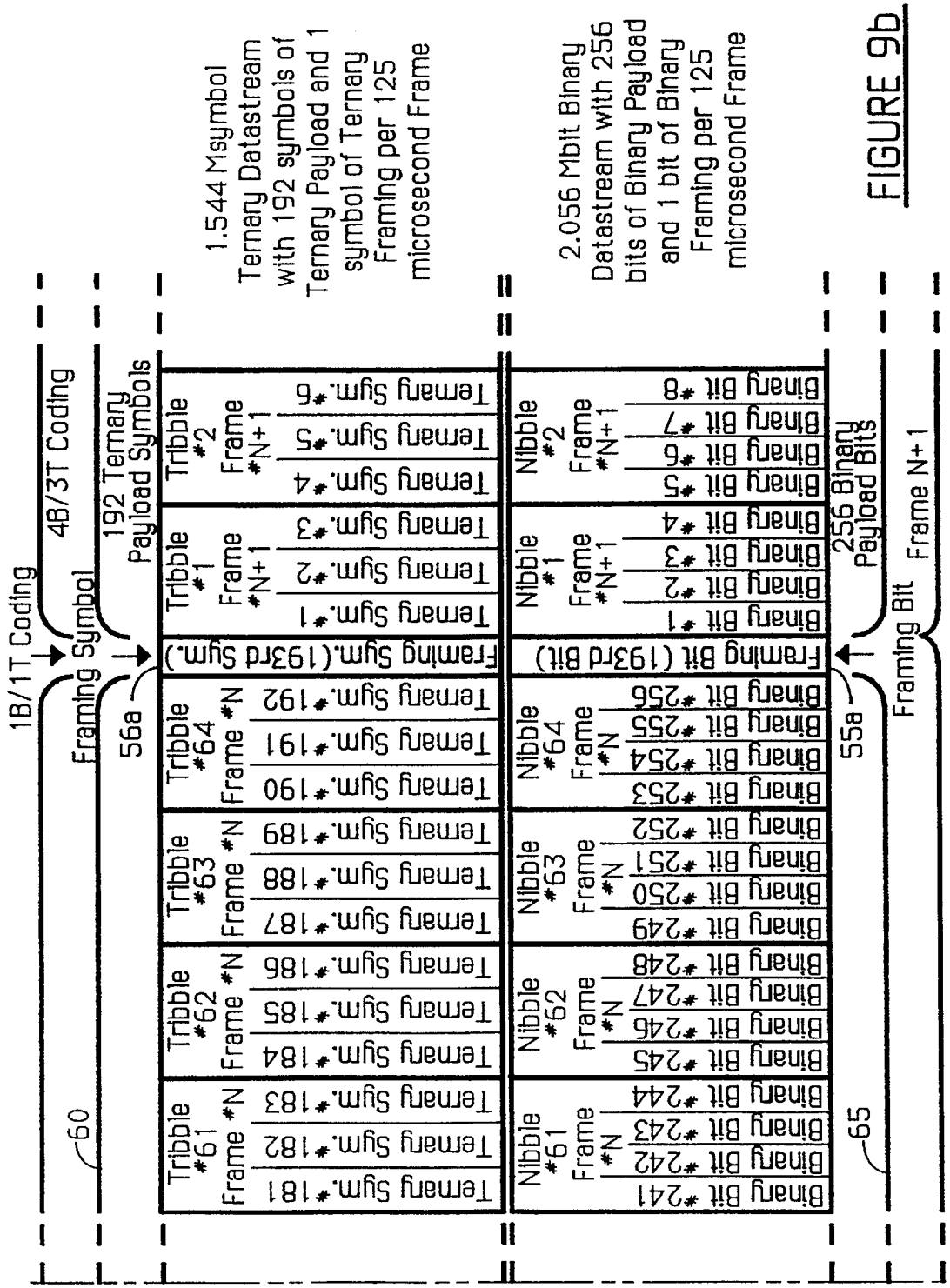

For the purposes of this invention, a "tribble" is defined as the 3 ternary symbols which are substituted for a given 4 binary bits which are already known in the art as a binary "nibble". FIGS. 9a and 9b together show the line code position relationship between the ternary and binary coded frames, according to the present invention, using for example the ternary/binary code table of FIG. 8 for the 192 ternary payload symbol only, with a special separate code used for the framing symbol, according to the teachings hereof, and as disclosed further below in FIG. 10.

FIG. 10 shows a novel 1B/1T coding table, according to the present invention, for coding framing data such as each of a plurality of binary framing bits 55a, 55b shown in FIGS. 9a and 9b into corresponding ternary framing symbols 56a, 56b. The ternary coded framing symbol 56a is shown as part of a 193 symbol datastream in a DS1-like 125 μsec frame 58 having the framing symbol 56a plus 192 ternary payload symbols 60. The 192 ternary payload symbols 60 are shown organized as 64 distinct "tribbles" which is a word coined herein to describe a 3 symbol unit used to encode a corresponding 4 bit binary nibble. For instance, tribble 62 represents a ternary encodement of a binary nibble 64 using the table of FIG. 8 to encode binary information into ternary information. This enables more efficient transmission over the DS1 physical infrastructure and when applied to sixty four nibbles, according to the present invention, exactly corresponds to the DS1 bandwidth except for the framing bit. The trouble with tribbles is thus that they don't exactly fit in the DS1 frame on nibble or byte boundaries. If the T148 approach of the prior art were then followed here, the framing bits would be encoded along with the data bits without discrimination and statistically detected at the receiving end.

In other words, in the prior art T148 span, the encodement of binary payload bits and framing bits was indiscriminate. A binary framing bit and three binary data bits would typically be encoded at every frame boundary into a three symbol ternary code and a statistical tribble detector would have to be used at the receiving end to determine the tribble boundaries. The present invention provides the ability to keep the encoded tribbles separate from the framing symbols thereby avoiding the need for a statistical tribble detection and allowing the continued use of existing DS1 frame detection technology and hardware that may already be deployed, as well as preserving all other existing and future capabilities provided in the framing bandwidth.

The framing bit, according to the present invention, however, is encoded differently, i.e., in a way to ensure that the payload tribbles are lined up with the frame boundaries. This is done using the Table of FIG. 10 on the framing bits. In this way, the 2.048 Mbits payload comprising the 64 binary nibbles shown in FIG. 9 as 256 binary payload bits can be coded with 192 ternary payload symbols in 64 corresponding tribbles, one for each nibble, and all exactly contained within a bandwidth of 1.536 Msymbol. When the separately coded framing symbol 56a is added to the frame 58 the bandwidth goes up to 1.544 Msymbol which exactly corresponds to the traditional DS1 bandwidth, i.e., at a rate of 1.544 Msymbol per second. In this way, existing DS1 framing, and frame detection techniques, frame bit capabilities may continue to be used.

As mentioned, a method for encoding a plurality of binary framing bits from the 2.056 Mbits binary datastream of FIGS. 9a and 9b into the corresponding plurality of ternary framing symbols in the 1.544 Mbits ternary datastream is shown in FIG. 10. This technique will be explained in more detail below. The example of FIGS. 9a and 9b shows a hybrid 4B/3T and 1B/1T methodology which allows the mapping of the binary frame into a ternary frame with no intermixture of framing bits with data bits in the ternary tribbles.

Figure 11:
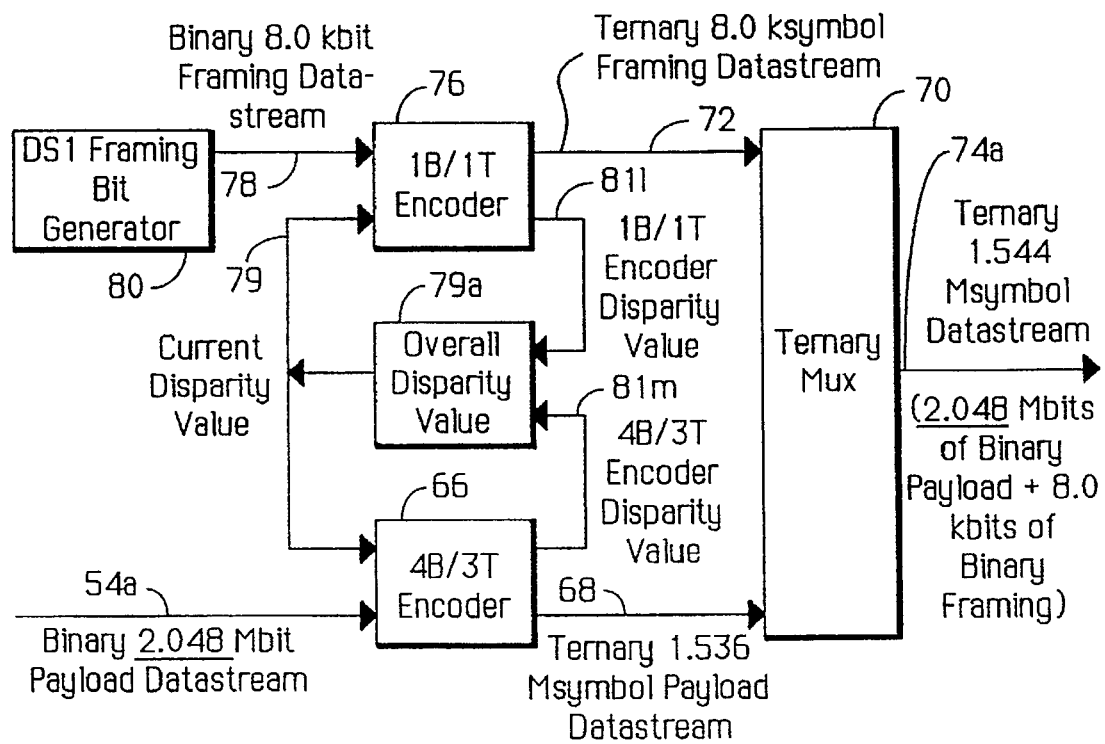
FIG. 11 shows a technique for providing a ternary 1.544 Msymbol datastream encoded by a hybrid line coding technique, according to the present invention.

Referring now to FIG. 11, the binary 2.048 Mbits payload datastream is shown on the line 54a and corresponds to 256 binary payload bits 65 shown in FIG. 9 comprising 64 nibbles. A 4B/3T encoder 66 encodes the binary datastream on the line 54a into a ternary datastream on a line 68 corresponding to the 192 ternary payload symbols 60 of FIGS. 9a and 9b organized as 64 separate tribbles, each corresponding to one of the nibbles in the 256 binary payload bits 65 of the binary datastream of FIGS. 9a and 9b. This ternary datastream on the line 68 is multiplexed in a ternary multiplexer 70 with a ternary 8.0 kilosymbol framing datastream on a line 72 in order to provide a ternary 1.544 Msymbol datastream on a line 74a corresponding to the 192 ternary payload symbols and a framing symbol for each frame 58 in ternary format. It should be noted that the 64 tribbles are lined up with respect to the frame boundaries and do not overlap so that they may be easily found at the receiving end using existing techniques.

According to the present invention, the ternary 8 kilosymbol; framing datastream on the line 72 may be provided by a selected encoder such as a 1B/1T encoder 76 that encodes a binary 8.0 ksymbol framing datastream on a line 78 into the ternary 8.0 kbit framing datastream on the line 72 and which may be done in accordance with the coding technique shown in FIG. 10. The binary 8.0 kbit framing datastream on the line 78 is from a DS1 framing bit generator 80.

Figure 12:
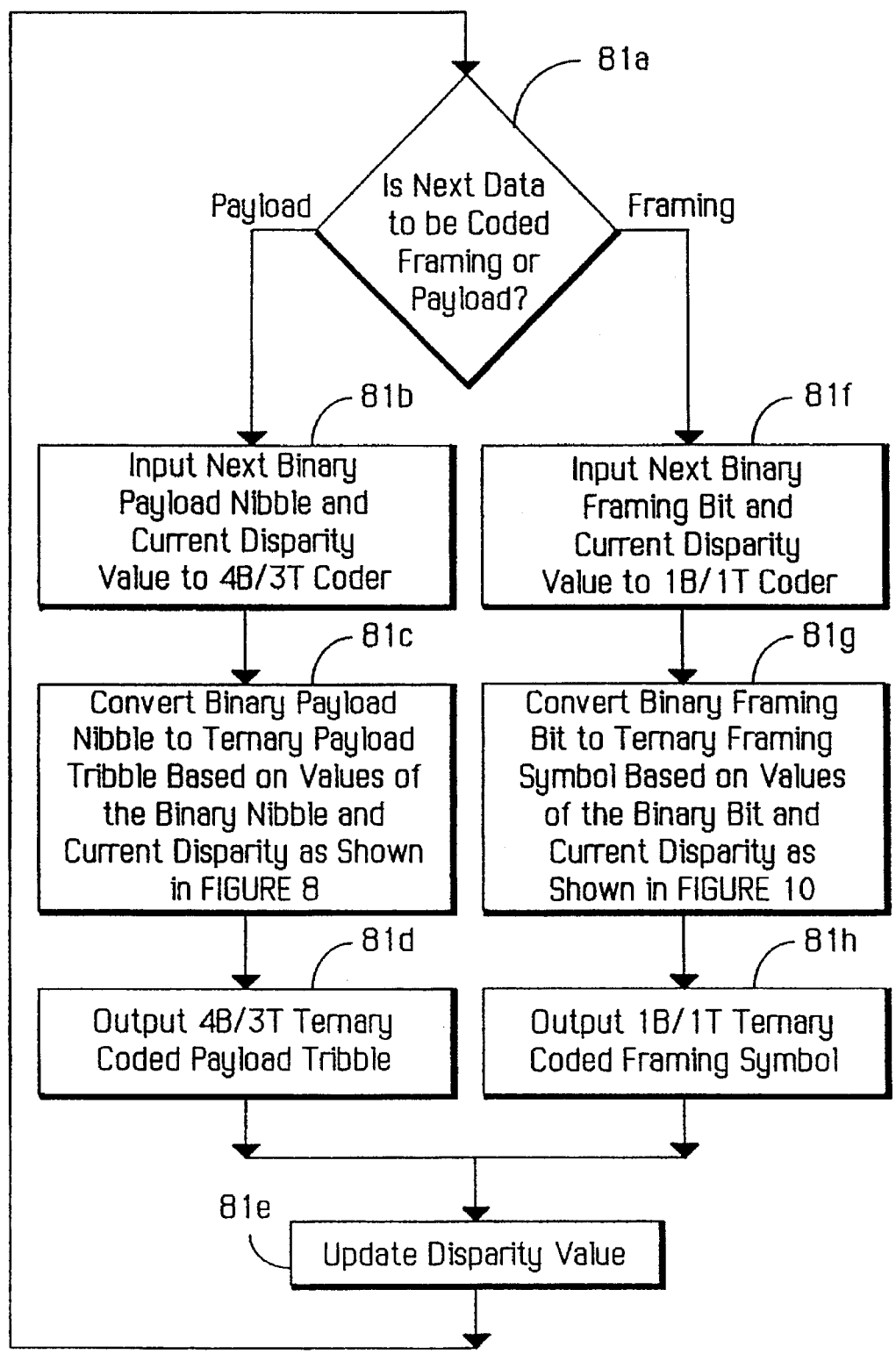
FIG. 12 shows a hybrid encoding process, according to the present invention, for providing 256 binary payload bits encoded into 192 ternary payload symbols, and with one binary framing bit encoded into one ternary framing symbol.

As shown in FIG. 12, in operation, the hybrid encoding process may comprise a number of steps, including a determination in a step 81a whether a next data or datum to be coded is framing or payload. If payload, a step 81b is next executed, in which the next binary payload nibble and a current disparity value as indicated on a line 79 from an overall disparity value block 79a are input to the 4B/3T encoder 66 with the payload from the line 54a. The encoder 66 converts the binary payload nibble to a ternary payload tribble based on the values of the binary nibble and the current disparity, as shown in FIG. 8. This all takes place in a step 81c. A step 81d is next executed in which the encoder 66 outputs a 4B/3T ternary coded payload tribble on the line 68, and the disparity value is updated, as indicated in a step 81e. The function of the block 79a is to be responsive to the 4B/3T encoder disparity value on a line 81m and a 1B/1T encoder disparity value on a line 811 for providing the current disparity value on the line 79. It thus has the function of determining the overall disparity value by considering the current disparity from either the 4B/3T encoder 66 or the 1B/1T encoder 76.

In the event that step 81a determines that a framing bit is next to be encoded, a step 81f is then executed wherein a next binary framing bit is input from line 78 along with the current disparity values on the line 79 to the 1B/1T encoder 76. A step 81g is next executed in order to convert the binary framing bit provided on the line 78 to a ternary framing symbol on the line 72, based on values of the binary bit and current disparity, according to the table of FIG. 10. A step 81h is next executed in order to output a 1B/1T ternary coded framing symbol on the line 72. At that point, the disparity value is updated as indicated in the step 81e, and an indication thereof provided on the line 811 to the disparity value block 79a.

Figure 13:
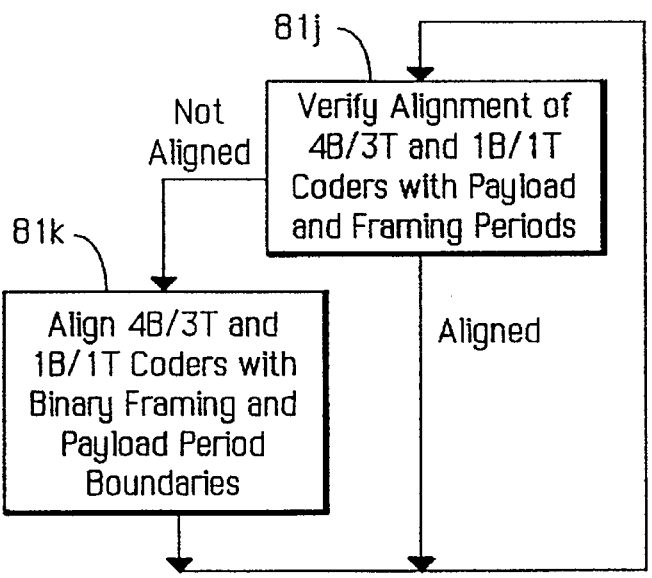
FIG. 13 shows a mechanism for ensuring alignment of the 4B/3T and 1B/1T encoders of FIG. 11 with the framing information boundaries, according to the present invention.

Not mentioned in the above series of steps of FIG. 12 is the fact that there must be some mechanism for insuring alignment of the 4B/3T and 1B/1T encoders with payload and framing periods. This may be carried out in hardware or software, or any desired combination thereof, as will be evident to one of ordinary skill in the art. This is shown in general in FIG. 13, wherein alignment is verified in a step 81j, which may be carried out by any selected hardware or software mechanism, and if found to be not aligned, appropriate steps taken as indicated in a step 81k to align the coder with the binary framing and payload period boundaries.

Also not mentioned is the exact mechanisms for selection of the appropriate ternary information for those cases where more than one choice of binary nibble values exist. Such is already known in the prior art and in general may be said to comprise the method of selecting the ternary code that most effectively reduces disparity. This need not be described in detail here.

Figure 14:
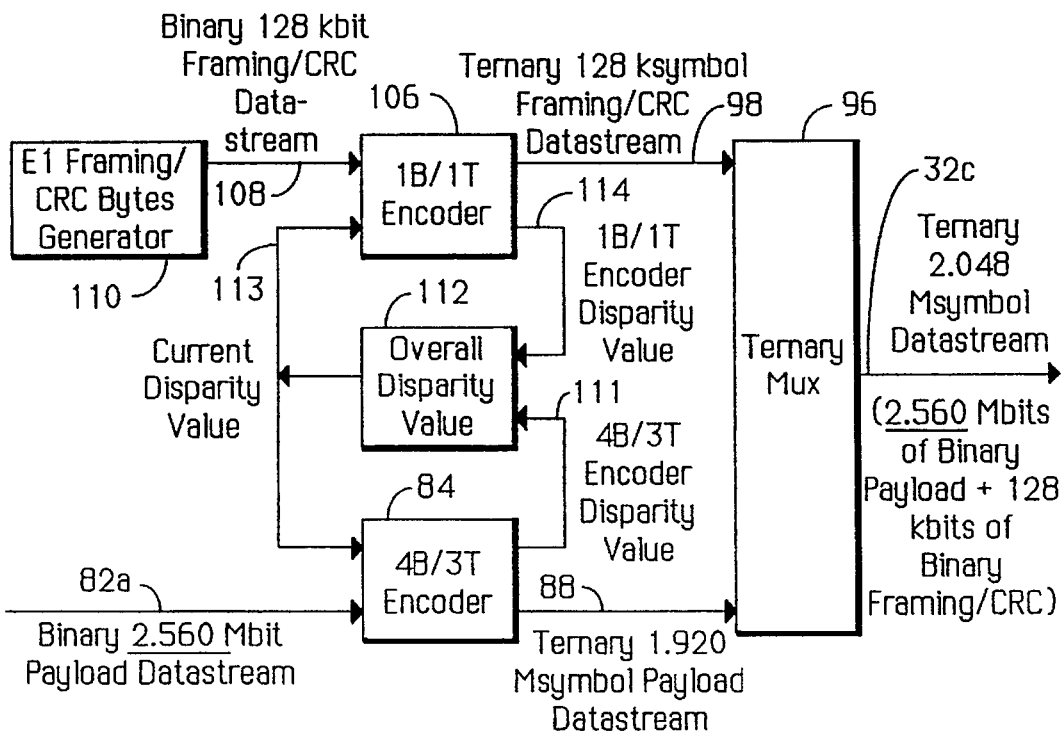
FIG. 14 shows a technique for providing a ternary 2.048 Msymbol datastream using a hybrid line coding technique, according to the present invention.

FIG. 14 is similar to FIG. 11 except applicable to a hybrid line coding format for the 2.048 Mbits E1 electrical transmission infrastructure 34 of FIG. 6 prevalent in Europe and elsewhere. Such an infrastructure is designed to carry 2.048 Msymbol ternary datastreams and suffers from the same sort of inefficiencies as the previously discussed ternary 1.544 Msymbol datastreams prevalent in North America and elsewhere.

Figure 15A:
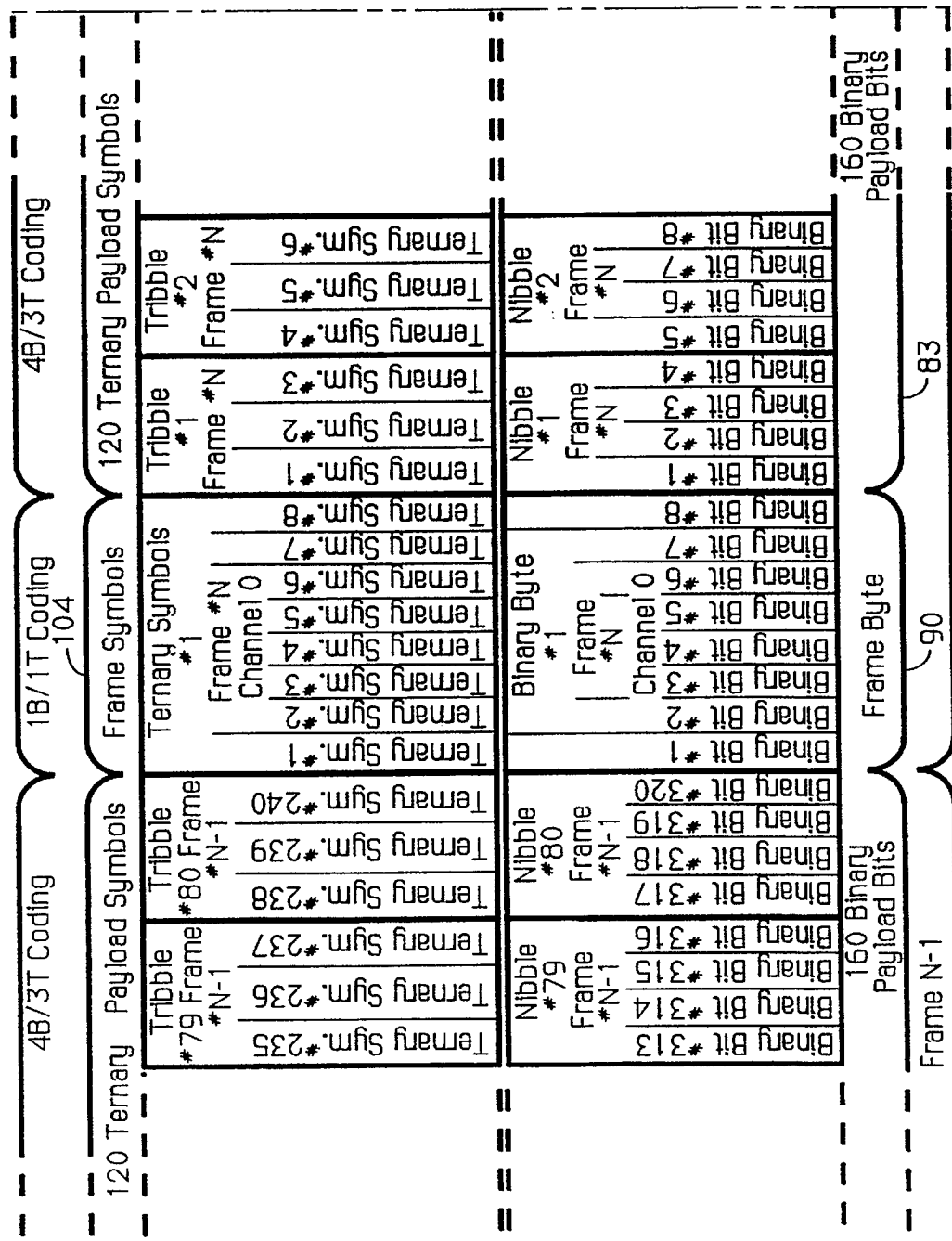
FIGS. 15a–15c together show a line code position relationship, according to the present invention, between 2.688 Mbits binary datastream and a 2.048 Msymbol ternary datastream.
Figure 15B:
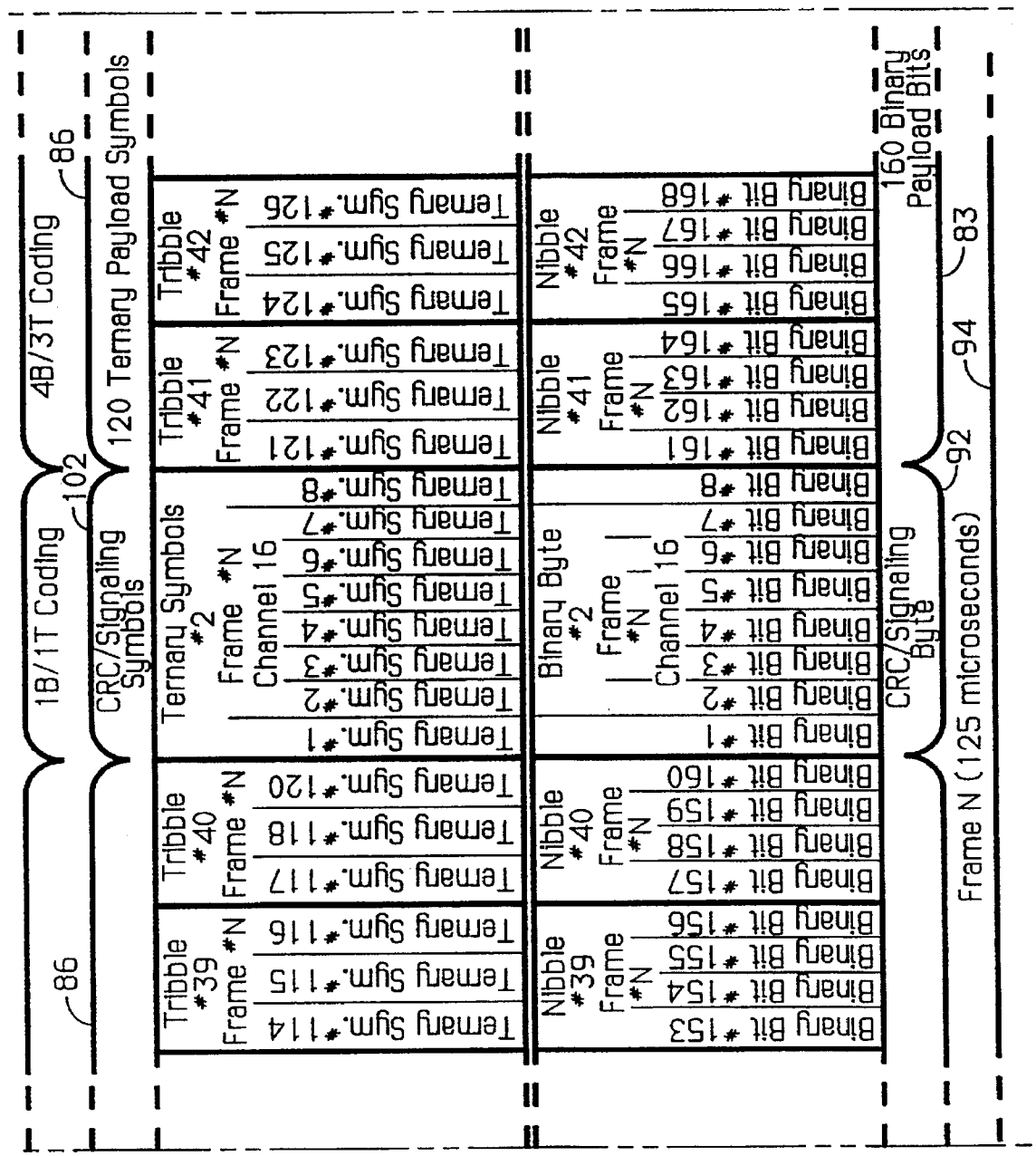
Figure 15C:
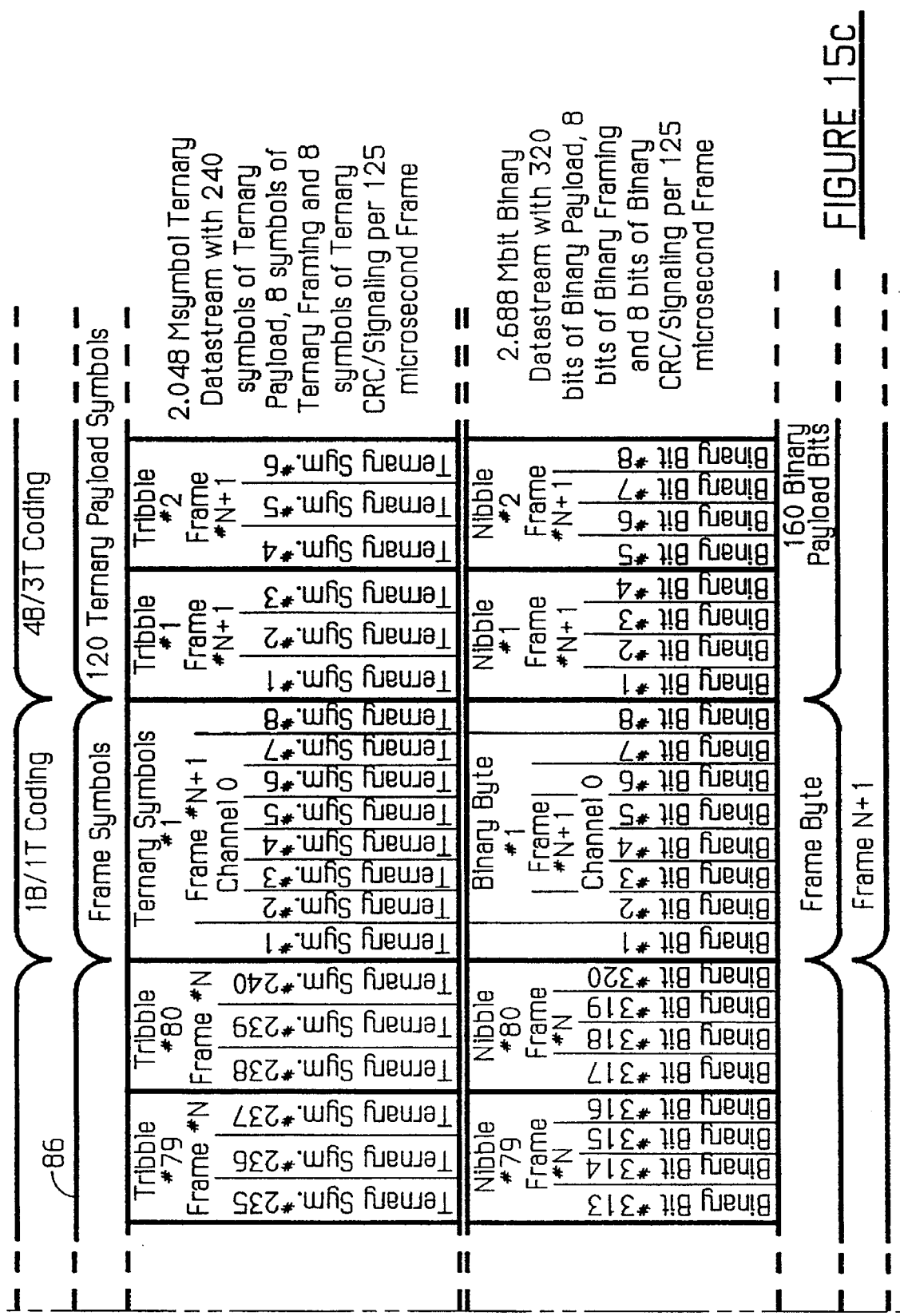

In FIG. 14, a binary 2.560 Mbits payload datastream on a line 82a such as shown as 320 binary payload bits 83 in FIG. 15 are provided to a 4B/3T encoder 84 that encodes the signal on the line 82a into 240 ternary payload symbols 86, as shown in FIG. 15a–15c, and as represented by a signal on a line 88 in FIG. 14. As mentioned, the 2.048 Mbits of binary E1 data of FIG. 7 comprise 8000 identical frames of 336 binary bits. The E1 binary frame comprises 320 binary payload bits 83, a frame byte 90 and a CRC/signaling byte 92, all contained within a 125 μsecond frame 94.

The ternary 1.920 Msymbol payload datastream on the line 88 of FIG. 14 is provided to a ternary multiplexer 96 that is also responsive to a ternary 128 Ksymbol framing/CRC datastream on a line 98. The ternary multiplexer 96 provides a ternary 2.048 Msymbol datastream on a line 32c that comprises the 240 ternary payload symbols 86 of FIGS. 15a–15c as provided by the signal on the line 88 of FIG. 14 and the CRC/signaling symbols 102 and frame symbols 104 of FIG. 15a provided on the line 98 of FIG. 14.

Similar to the case for FIG. 11, according to the invention, an encoder such as a 1B/1T encoder 106 is responsive to a binary 128 kbit framing/CRC datastream on a line 108 such as shown by the CRC/signaling byte 92 and frame byte 90 of FIG. 15a as provided by an E1 framing/CRC bytes generator 110 as shown in FIG. 14.

As in FIG. 11, the 4B/3T encoder 84 communicates disparity information on a line 111 to a block 112 for a determination of overall disparity as indicated on a line 113. Similarly, at the same time as the ternary frame byte or CRC/signaling byte is provided on the line 98, a 1B/1T disparity value signal is provided on a line 114.

Figure 16:
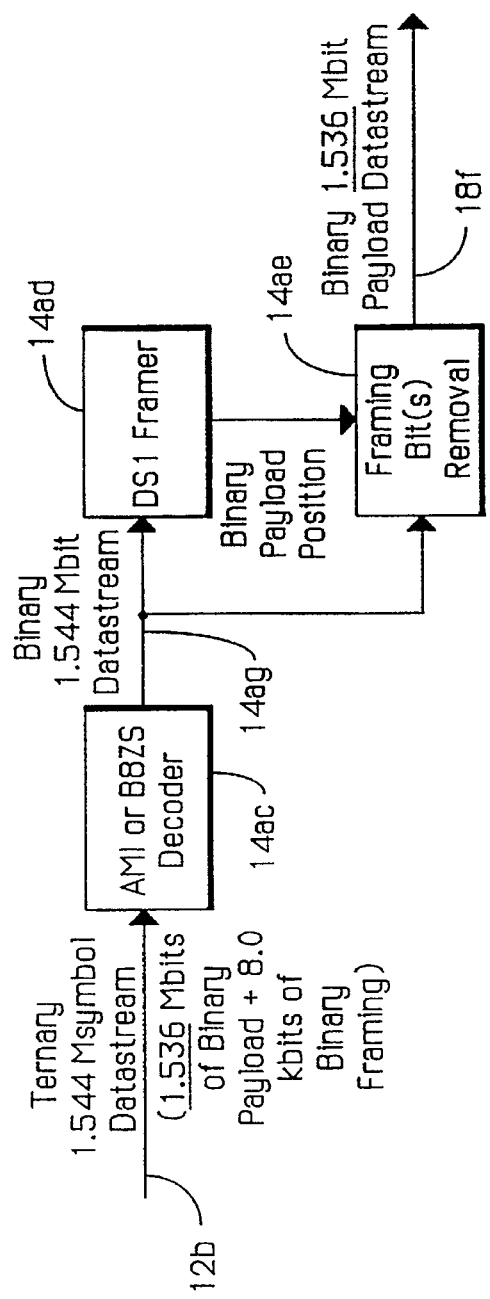
FIG. 16 shows a prior art AMI or B8ZS decoder in conjunction with framing and which might be included in an existing DS1 line coding/decoding block 15b, such as shown in FIG. 1.

FIG. 16 illustrates decoding hardware such as exists in the prior art of FIG. 1, and such as would be found in each one of the existing DS1 line coding/decoding blocks 14a, 14b and framing blocks 16a, 16b of FIG. 1, along with an encoder 14aa and other hardware such as shown in FIG. 3. A ternary 1.544 Msymbol datastream on the line 12b is provided to an AMI or B8ZS decoder 14ac which, in turn, provides a binary 1.544 Mbits datastream on a line 14ag to a DS1 framer 14ad and a framing bit removal block 14ae. The DS1 framer and framing bit removal block together provide the binary 1.536 Mbits payload datastream on the line 18f of FIG. 1.

Figure 17:
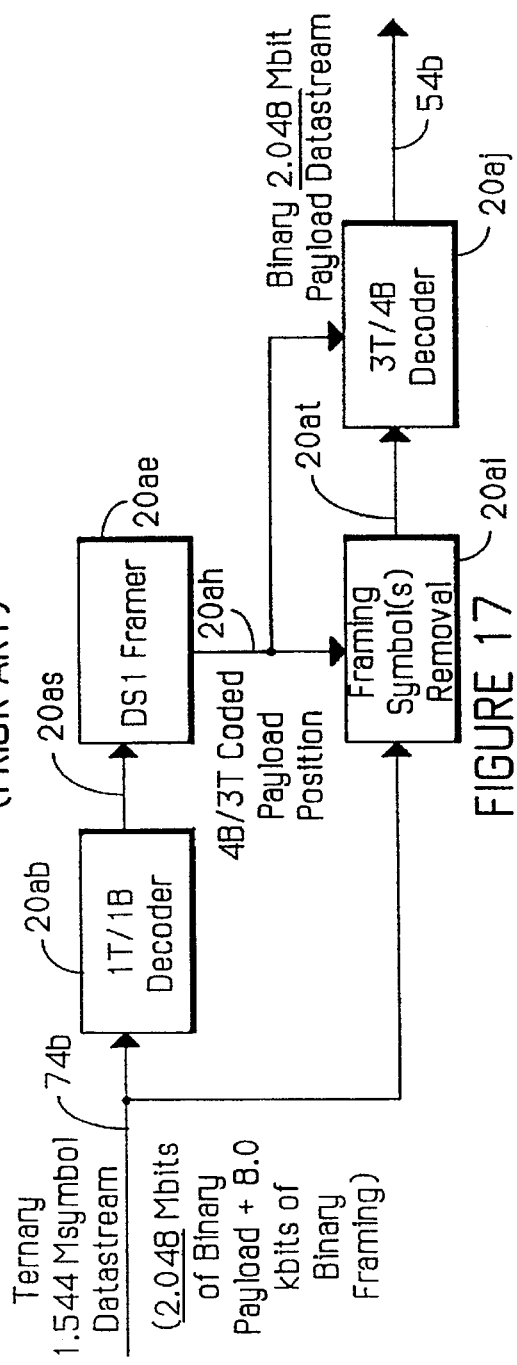
FIG. 17 shows a decoder in conjunction with framing, such as might be included in the hybrid DS1 line coding/decoding block 20b of FIG. 2, according to the present invention.

FIG. 17 shows a decoder, according to the present invention, such as would be provided in a hybrid DS1 line coding/decoding block 20a and framing block 24a of FIG. 2, along with an encoder such as shown in FIG. 11.

Figure 18:
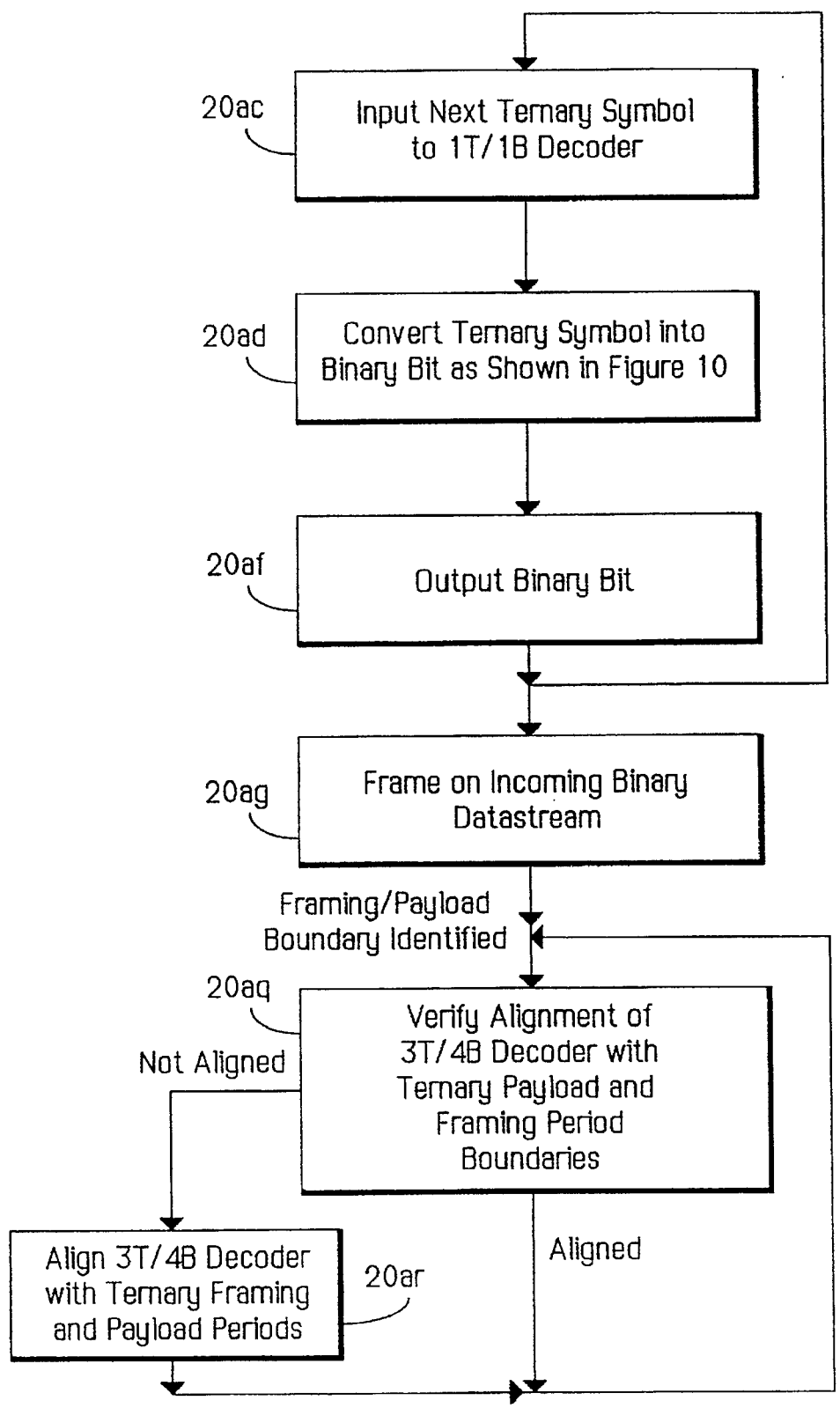
FIG. 18 shows a series of steps which may be carried out by the 1T/1B decoder of FIG. 17, according to the present invention.

FIG. 18 shows a routine carried out partially in a 1T/1B decoder 20ab of FIG. 17, beginning with a step 20ac in which a next ternary input symbol on the line 74b to the 1T/1B decoder 20ab is converted from a ternary symbol into a binary bit using the Table of FIG. 10 as indicated in a step 20ad in FIG. 18. For each of these incoming ternary symbols, a binary bit is output on a line 20as to a DS1 framer 20ae as indicated in a step 20af, which is used to detect a fixed binary pattern, e.g., a DS1 framing pattern as indicated in a step 20ag. This provides an indication on a line 20ah to a framing bit removal block 20ai that a particular incoming ternary symbol on the line 74b is a framing symbol.

Figure 19:
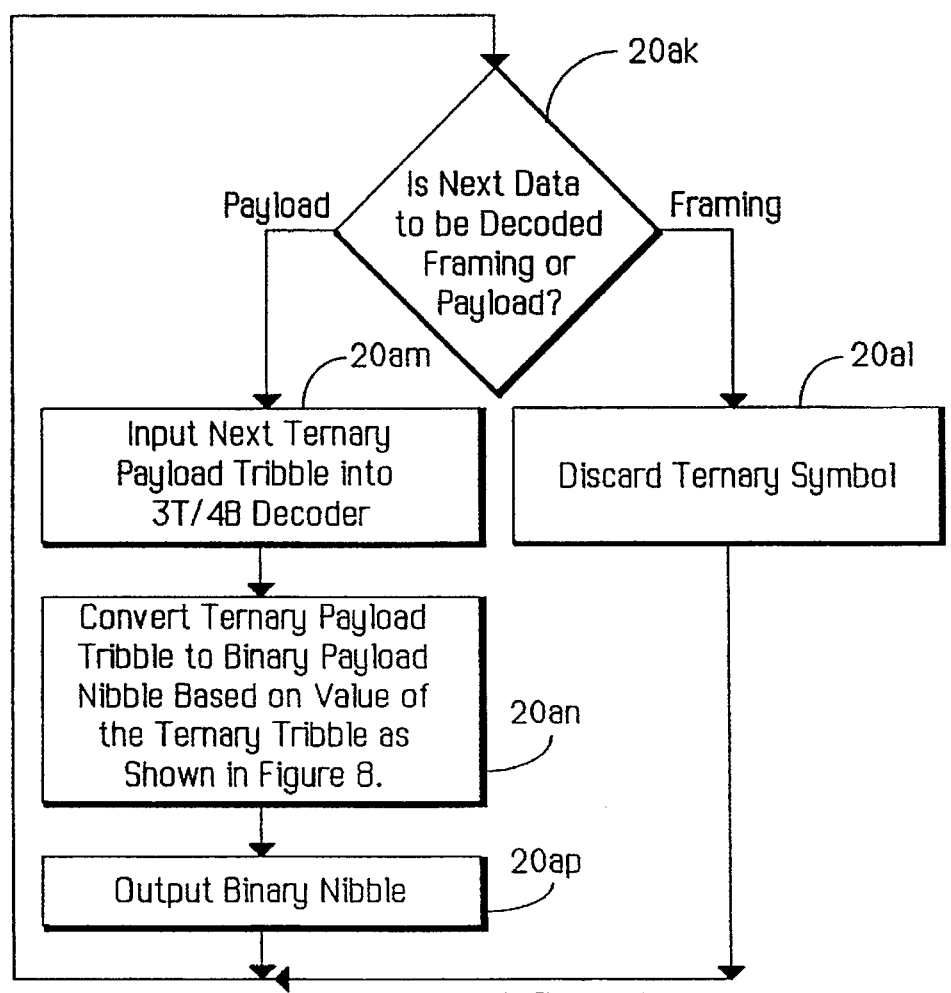
FIG. 19 shows a series of steps which may be carried out by the framing symbol removal block and 3T/4B decoder of FIG. 17, according to the present invention.

FIG. 19 shows steps carried out by the framing symbol removal block 20ai and a 3T/4B decoder 20aj in FIG. 17.

Upon receiving an indication on the line 20ah from the DS1 framer 20ae that the particular incoming ternary symbol is a framing symbol, the framing symbol removal block 20ai makes a decision in a step 20ak that the next data to be decoded is a framing bit, and the ternary symbol is discarded as indicated in a step 20al FIG. 19. On the other hand, for symbols that are not detected as being framing symbols, the symbol is provided on a line 20t to the 3T/4B decoder 20aj after a decision 20ak is made that the next data to be decoded is a payload symbol, and a series of steps 20am, 20an, 20ap are carried out by the 3T/4B decoder 20aj, including the step 20an of converting the ternary payload tribble to a binary payload nibble based on the value of the ternary tribble, as shown in FIG. 8. The 3T/4B decoder then outputs the binary nibble obtained from the table on the line 54b, as indicated in step 20ap in FIG. 19 and line 54b in FIGS. 17 and 2.

Referring back to FIG. 18, the first three steps thereof are shown being executed by the 1T/1B decoder 20ab of FIG. 17 endlessly, until a framing bit is detected by the DS1 framer 20ae, after which, framing is accomplished by the previously-described outputs to the framing bit removal block 20ai and the 3T/4B decoder 20aj. Also shown in FIG. 18 is a generalized pair of steps 20aq, 20ar that verify alignment of the 3T/4B decoder with the ternary payload and framing period boundaries. If aligned, then no steps need be taken, and if not aligned, alignment is accomplished. As in the case for encoding, as described above, this may be carried out automatically by hardware or by software alone, or a combination of both.

Similar to FIG. 16, FIG. 20 shows a prior art HDB3 decoder 36ab that is responsive to a ternary 2.048 Msymbol data stream on the line 32b (see FIG. 5) for providing a decoded binary data stream on a line 36ac to an E1 framer 36ad which indicates the binary payload position on a line 36ae to a framing/CRC/signaling byte removal block 36af also responsive to the decoded binary data stream on the line 36ac for providing the binary 1.920 Mbit payload data stream on the line 40f (see FIG. 5). According to the present invention, as shown in FIG. 21, a ternary 2.048 Msymbol data stream on a line 32b (see FIG. 6) is provided to a 1T/1B decoder 42ab within the hybrid E1 line coding/decoding block 42a of FIG. 6 wherein an E1 framer 42ac provides a signal on a line 42af to a framing/CRC symbol removal block 42ad which in turn provides a ternary payload datastream on a line 42ag to a 3T/4B decoder 42ae with the ternary payload with the framing decoded for providing the binary 2.560 Mbits payload data stream on a line 82b of FIG. 6. The flowcharts of FIGS. 18 and 19 apply to FIG. 21 as well.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A method, comprising the steps of:
   (a) determining a next data bit and current disparity value signal to be coded is either (i) a binary framing bit and next executing a step (b) or (ii) a binary payload bit and next executing a step (c);
   (b) converting the next binary framing bit and the current disparity value signal to a ternary framing symbol using a first encoding method;
   (c) converting the next binary payload bit and the current disparity value signal to a ternary payload symbol using a second encoding method, providing an updated disparity value signal and repeating step (a).

2. The method of claim 1, wherein the step (b) of converting is carried out using a one binary bit to one ternary symbol (1B1T) encoder.

3. The method of claim 2, wherein the step (c) of converting is carried out using a four binary bit to three ternary symbol (4B3T) encoder.

4. The method of claim 3, wherein the binary payload bits have a payload bit period and the binary framing bits have a framing bit period, wherein the method further comprises the steps of:

determining alignment of the framing bit period with the payload bit period and when misalignment is determined, aligning the framing bit period with the payload bit period.

5. The method of claim 1, wherein the step (c) of converting is carried out using a four binary bit to three ternary symbol (4B3T) encoder.

6. Apparatus for providing a ternary payload plus framing datastream signal, comprising:

a ternary multiplexer, responsive to a ternary framing datastream signal and to a ternary payload datastream signal, for providing the ternary payload plus framing datastream signal;

a framing encoder, responsive to a binary framing datastream signal, for providing the ternary framing datastream signal; and a data encoder, responsive to a binary payload datastream signal, for providing the ternary payload datastream signal.

7. The apparatus of claim 6, wherein said ternary multiplexer is a time-division multiplexer.

8. A binary bit to ternary symbol encoding method, comprising the steps of:

receiving (81f) a binary framing bit and current disparity value signal;

converting (81g) the binary framing bit to a ternary framing symbol based on the binary framing bit and the current disparity value signal according to a first encoding method;

providing (81h) the ternary framing symbol; and updating (81e) the current disparity value signal wherein the foregoing steps are performed in a repetitive manner exclusively on framing bits whereby payload bits are encoded separately according to a second encoding method for combination with framing bits encoded according to said foregoing steps.

9. Apparatus for communicating bidirectional signal information over a pair (12; 32) of twisted wire pairs each for carrying a first selected number (192; 240) of binary payload bits encoded as said first selected number of ternary payload symbols per frame at a selected symbol rate (1.544 Msymbols/second; 2.048 Msymbols/second), comprising:

a first hybrid line coder/decoder (20a; 42a), responsive to a first binary payload datastream signal (54a; 82a) having an increased number (256; 320) of binary payload bits increased over said first selected number per frame and responsive to a first framing information signal, for providing a first ternary payload plus framing signal (74a; 32c) with said increased number (256; 320) of binary payload bits per frame encoded as said first selected number (192; 240) of ternary payload symbols per frame at said selected symbol rate, the first hybrid line coder/decoder (20a; 42a) also responsive to a second ternary payload plus framing signal (74b; 32b) having the increased number (256; 320) of binary payload bits per frame encoded as said first selected number (192; 240) of ternary payload symbols at said selected symbol rate, for providing a decoded second binary payload datastream signal (54b; 82b); and a second hybrid line coder/decoder (20b; 42b), responsive to a third binary payload datastream signal (54bb; 46d) for providing the second ternary payload plus framing signal (74b; 32b) with said increased number (256; 320) of binary payload bits per frame encoded as said first selected number (192; 240) of ternary payload symbols per frame at said selected symbol rate, the second hybrid line coder/decoder also responsive to the first ternary payload plus framing signal (74a; 32c) for providing a fourth binary payload datastream signal (54ab; 46c).

10. The apparatus of claim 9, wherein said first and second hybrid line coder/decoders (20a, 20b; 42a; 42b) comprise:

corresponding encoders, comprising:

corresponding ternary multiplexers (70; 96), responsive to corresponding ternary framing data stream signals (72; 98) and to corresponding ternary payload datastream signals (68; 88), for correspondingly providing the first ternary payload plus framing signal (74a; 32c) and the second ternary payload plus framing signal (74b; 32b);

corresponding one binary bit to one ternary symbol (1B1T) encoders (76; 106), responsive to corresponding binary framing datastream signals (78; 108), for providing corresponding ternary framing datastream signals; and corresponding four binary bit to three ternary symbol (4B3T) encoders (66; 84), responsive to corresponding first binary payload datastream signals (54a, 54bb; 82a; 46d), for providing corresponding ternary payload datastream signals (74a, 74b; 32c, 32b); and corresponding decoders, comprising:

corresponding one ternary symbol to one binary bit (1T1B) decoders (20ab; 42ab), correspondingly responsive to the first ternary payload plus framing signal (74a; 32c) and the second ternary payload plus framing signal (74b; 32b), for providing corresponding decoded signals (20as; 42ah);

corresponding framers (20ae; 42ac), correspondingly responsive to the decoded signals, for providing a payload position signal (20ah; 42af); and corresponding three ternary symbol to four binary bit (3T4B) decoders (20aj; 42ae), correspondingly responsive to the payload position signals and to the corresponding ternary payload datastream signals without framing, for providing corresponding second binary payload datastream signals (54b, 54ab; 82b, 46c).

11. The apparatus of claim 10, wherein each corresponding 1B1T encoder provides a 1B1T encoder disparity signal (81l; 114), each corresponding 4B3T encoder provides a 4B3T disparity signal (81m; 111), wherein each corresponding encoder further comprises means (70aa; 112), responsive to the 1B1T and 4B3T disparity signals, for providing a corresponding current disparity value signal (79; 113), and wherein the corresponding 1B1T (76; 106) and 4B3T (66; 84) encoders are responsive to the corresponding current disparity value signal for respectively providing corresponding ternary framing datastream (72; 98) and ternary payload datastream (68; 88) signal with a selected minimum or zero disparity.

12. The apparatus of claim 6, wherein the framing encoder is:

a one binary bit to one ternary symbol (1B1T) encoder, responsive to the binary framing datastream signal, for providing the ternary framing datastream signal; and wherein the data encoder is a four binary bit to three ternary symbol (4B3T) encoder, responsive to the binary payload datastream signal, for providing the ternary payload datastream signal.

13. The apparatus of claim 12, wherein the 1B1T encoder provides a 1B1T encoder disparity signal, the 4B3T encoder provides a 4B3T disparity signal, wherein the apparatus further comprises means responsive to the 1B1T and 4B3T disparity signals, for providing a current disparity value signal, and wherein the 1B1T and 4B3T encoders are responsive to the current disparity value signal for respectively providing the ternary framing datastream and ternary payload datastream signals with a selected minimum or zero disparity.

14. The apparatus of claim 13, wherein the apparatus is also for providing a second binary payload datastream signal, further comprising:

a one ternary symbol to one binary bit (1T1B) decoder, responsive to a second ternary payload plus framing datastream signal, for providing a decoded signal;

a framer, responsive to the decoded signal, for providing a payload position signal; and a three ternary symbol to four binary bit (3T4B) decoder, responsive to the payload position signal and to a ternary payload datastream signal part of the second ternary payload plus framing datastream signal, for providing the second binary payload datastream signal.

15. The apparatus of claim 12, wherein the ternary payload plus framing datastream signal is a 1.544 Megasymbol per second datastream signal (74a) on a Digital Signal-Level 1 (DS-1) signal line, the binary framing datastream signal is an 8.0 kilobit per second framing datastream signal (78), the ternary framing datastream signal is an 8.0 kilosymbol per second framing datastream signal (72), the ternary payload datastream signal is a 1.536 Megasymbol per second payload datastream signal (68), and the binary payload datastream signal is a 2.048 Megabit per second payload datastream signal (54a).

16. The apparatus of claim 12, wherein the ternary payload plus framing data stream signal is a 2.048 Megasymbol per second data stream signal on an E1 signal line, the binary framing datastream is a 128 kilobit per second framing/cyclic redundancy code (CRC) datastream signal (108), the ternary framing datastream is a 128 kilosymbol per second framing/cyclic redundancy code (CRC) datastream signal (98), the ternary payload data stream signal is a 1.920 Megasymbol per second payload datastream signal (88), and the binary payload datastream signal is a 2.560 Megabit per second payload datastream signal (82a).

17. The apparatus of claim 12, wherein the binary payload datastream signal comprises a plurality of frame-aligned binary nibbles, bounded by binary framing bits and wherein the ternary payload plus framing datastream signal comprises an equal plurality of frame-aligned ternary tribbles bounded by ternary framing symbols.

18. The apparatus of claim 17, wherein the plurality equals eighty.

19. The apparatus of claim 17, wherein the plurality equals sixty-four.

* * * * *

UNITED STATES PATENT AND TRADEMARK OFFICE
CERTIFICATE OF CORRECTION

PATENT NO. : 5,633,892
DATED : May 27, 1997
INVENTOR(S) : D. Krisher

It is certified that error appears in the above-indentified patent and that said Letters Patent is hereby corrected as shown below:

At column 1, line 32, please cancel "Megasymbolss" and substitute --Megasymbols-- therefor;

at line 59, please cancel "ternary codes" and substitute --ternary symbols-- therefor;

at line 61, please cancel "symbol" and substitute --symbols-- therefor;

at line 62, please cancel "symbol" and substitute --symbols-- therefor; and at line 63, please cancel "codes" and substitute --symbols-- therefor.

At column 2, line 1, please cancel "symbol" and substitute --symbols-- therefor; and at lines 17-18, please cancel "(4 binary symbols/3 ternary bits)" and substitute therefor --(4 binary bits/3 ternary symbols)--.

UNITED STATES PATENT AND TRADEMARK OFFICE
CERTIFICATE OF CORRECTION

PATENT NO. : 5,633,892
DATED : May 27, 1997
INVENTOR(S) : D. Krisher

It is certified that error appears in the above-indentified patent and that said Letters Patent is hereby corrected as shown below:

At column 4, line 7, prior to "part", please cancel "bit";

at lines 17-18, please cancel "binary bits" and substitute --ternary symbols-- therefor;

at line 18, after "240", please cancel "bits" and substitute --symbols-- therefor;

at line 50, after "ternary", please cancel --words--; and at line 53, please cancel "word" and substitute therefor --tribble--.

At column 5, line 17, prior to "rate", please insert --symbol--;

at line 28, please cancel "Mbits" and substitute therefor --Mbit--; and at line 51, please cancel "Mbits" and substitute therefor --Mbit--.

UNITED STATES PATENT AND TRADEMARK OFFICE
CERTIFICATE OF CORRECTION

PATENT NO. : 5,633,892
DATED : May 27, 1997
INVENTOR(S) : D. Krisher

It is certified that error appears in the above-indentified patent and that said Letters Patent is hereby corrected as shown below:

At column 6, line 27, please cancel "symbol" and substitute therefor --symbols--; and at line 44, please cancel "Mbits" and substitute therefor --Mbit--.

At column 7, line 5, please cancel "Mbits" and substitute therefor --Mbit--; and at line 46, please cancel "Mbits" and substitute therefor --Mbit--.

At column 8, line 2, please cancel "Mbits" and substitute therefor --Mbit--; and at line 57, please cancel the extra space between "symbol" and the ",".

At column 9, line 53, please cancel "Mbits" and substitute therefor --Mbit--.

UNITED STATES PATENT AND TRADEMARK OFFICE
CERTIFICATE OF CORRECTION

PATENT NO. : 5,633,892
DATED : May 27, 1997
INVENTOR(S) : D. Krisher

It is certified that error appears in the above-identified patent and that said Letters Patent is hereby corrected as shown below:

At column 10, line 5, please cancel ";" prior to "framing";

at line 13, please cancel "." after "FIG. 12" and substitute --,-- therefore;

at line 29, please cancel "811" and substitute --811-- therefor;

at line 46, please cancel "811" and substitute --811-- therefor; and at line 67, please cancel "Mbits" and substitute therefor --Mbit--.

At column 11, line 52, after "2", please cancel the "." and substitute therefor --,--.

At column 12, line 5, please cancel "bit" and substitute therefor --symbol--; and at line 47, please cancel "Mbits" and substitute therefor --Mbit--.

UNITED STATES PATENT AND TRADEMARK OFFICE
CERTIFICATE OF CORRECTION

PATENT NO.  : 5,633,892
DATED       : May 27, 1997
INVENTOR(S) : D. Krisher

It is certified that error appears in the above-identified patent and that said Letters Patent is hereby corrected as shown below:

At column 14, line 57 (claim 11, line 3), please cancel "(811; 114)" and substitute ----(811; 114)-- therefor.

At column 16, lines 9-10 and 10-11 (claim 15, lines 9-10 and 10-11), "datastream" is incorrectly divided in each instance.

Signed and Sealed this

Sixteenth Day of December, 1997

Attest:

BRUCE LEHMAN

Attesting Officer        Commissioner of Patents and Trademarks